(12) United States Patent
Frenken et al.

(10) Patent No.: US 9,015,916 B2
(45) Date of Patent: Apr. 28, 2015

(54) METHOD FOR THE PRESSING OF A PRESS FITTING, AND PRESSING TOOL FOR THIS PURPOSE

(71) Applicant: Gustav Klauke GmbH, Remscheid (DE)

(72) Inventors: Egbert Frenken, Heinsberg (DE); Frank Wilsdorf, Wermelskirchen (DE); Michael Schmitz, Olpe (DE); Stefan Wascheszio, Remscheid (DE); Ulrich Meyer, Wermelskirchen (DE)

(73) Assignee: Gustav Klauke GmbH, Remscheid (DE)

( * ) Notice: Subject to any disclaimer, the term of this patent is extended or adjusted under 35 U.S.C. 154(b) by 156 days.

(21) Appl. No.: 13/919,397

(22) Filed: Jun. 17, 2013

(65) Prior Publication Data

US 2013/0277958 A1 Oct. 24, 2013

Related U.S. Application Data

(62) Division of application No. 12/377,520, filed as application No. PCT/EP2007/058731 on Aug. 22, 2007, now Pat. No. 8,490,261.

(30) Foreign Application Priority Data

Aug. 22, 2006 (DE) .......... 10 2006 039 364
Oct. 20, 2006 (DE) .......... 10 2006 050 427

(51) Int. Cl.
*B23P 19/04* (2006.01)
*F16L 13/14* (2006.01)
(Continued)

(52) U.S. Cl.
CPC ............ *F16L 13/141* (2013.01); *Y10T 29/5367* (2015.01); *Y10T 29/53987* (2015.01);
(Continued)

(58) Field of Classification Search
USPC ........ 29/235, 237, 243.5, 243.55, 519, 238.5, 29/252; 72/407, 416
See application file for complete search history.

(56) References Cited

U.S. PATENT DOCUMENTS 3,244,441 A 4/1966 Caudle
5,007,667 A 4/1991 Unewisse et al.
(Continued)

FOREIGN PATENT DOCUMENTS

DE 29521410 6/1997
DE 101 44 100 2/2003
(Continued)

*Primary Examiner* — Lee D Wilson
(74) *Attorney, Agent, or Firm* — Klintworth & Rozenblat IP LLC

(57) ABSTRACT

A method for the pressing of a press fitting, with a tube inserted into the press fitting, by way of a pressing tool, wherein the press fitting has an encircling bead in which an O-sealing ring is placed, wherein the tube ends within the press fitting and a first pressing is carried out within the bead, wherein, furthermore, a further pressing is carried out on the tube-insert side of the press fitting at a distance from the bead, the further pressing leading to press fitting and tube obtaining a conicity which prevents them being pulled off and runs in the same direction. Furthermore, the invention relates to a pressing tool suitable for carrying out the method. In order to further improve a method of the type under discussion, in particular for simplifying the handling over the course of the pressing operation, and in order to improve a pressing tool of the type under discussion, in particular in terms of handling while maintaining the functional reliability of the press connection winch is to be produced, it is proposed, in terms of the method, that the head is widened axially over the course of the pressing operation by being acted upon radially from the outside. In terms of the object, it is provided that the first pressing geometry, which is assigned to the bead, leaves the bead space at least in one direction for the axial widening of the bead.

14 Claims, 17 Drawing Sheets

(51) Int. Cl.
   *B21D 39/04*   (2006.01)
   *B25B 27/10*   (2006.01)

(52) U.S. Cl.
   CPC ...... *Y10T29/49908* (2015.01); *Y10T 29/49927* (2015.01); *Y10T 29/53996* (2015.01); *B21D 39/046* (2013.01); *B25B 27/10* (2013.01); *F16L 13/142* (2013.01)

(56) References Cited

U.S. PATENT DOCUMENTS

| | | | |
|---|---|---|---|
| 5,025,546 A | | 6/1991 | Gotoh et al. |
| 5,121,625 A | | 6/1992 | Unewisse et al. |
| 5,168,618 A | | 12/1992 | Unewisse et al. |
| 5,307,664 A | | 5/1994 | Homm |
| 5,377,400 A | | 1/1995 | Homm |
| 5,484,174 A | | 1/1996 | Gotoh et al. |
| 5,697,135 A | * | 12/1997 | Dischler .......... 29/237 |
| 6,049,962 A | | 4/2000 | Pfeiffer |
| 6,058,755 A | | 5/2000 | Viegener |
| 6,260,891 B1 | | 7/2001 | Foering et al. |
| 6,581,983 B1 | | 6/2003 | Viegener |
| 6,805,385 B2 | | 10/2004 | Viegener |
| 7,143,626 B2 | | 12/2006 | Dole |
| 7,779,523 B2 | | 8/2010 | Frenken |
| 7,788,779 B2 | * | 9/2010 | Frenken .......... 29/237 |
| 7,818,856 B2 | | 10/2010 | Raczuk |
| 7,823,271 B2 | | 11/2010 | Xie et al. |
| 7,984,538 B2 | | 7/2011 | McKay |
| 7,987,690 B2 | | 8/2011 | Duggan et al. |
| 8,112,876 B2 | | 2/2012 | Xie et al. |
| 8,112,877 B2 | | 2/2012 | Xie et al. |
| 8,782,863 B2 | * | 7/2014 | Pfeiffer .......... 29/237 |
| 8,904,848 B2 | * | 12/2014 | Frenken .......... 72/416 |
| 2005/0125978 A1 | | 6/2005 | Frenken |
| 2008/0276683 A1 | | 11/2008 | Frenken |
| 2008/0307934 A1 | | 12/2008 | Coe |
| 2010/0107393 A1 | | 5/2010 | Vernasca et al. |
| 2010/0229368 A1 | * | 9/2010 | Frenken et al. .......... 29/516 |
| 2010/0253066 A1 | | 10/2010 | Cygler et al. |

FOREIGN PATENT DOCUMENTS

| | | |
|---|---|---|
| DE | 203 18 618 | 4/2005 |
| EP | 1 455 969 | 9/2004 |
| JP | 4-248090 | 9/1992 |
| WO | 98/57086 | 12/1998 |

* cited by examiner

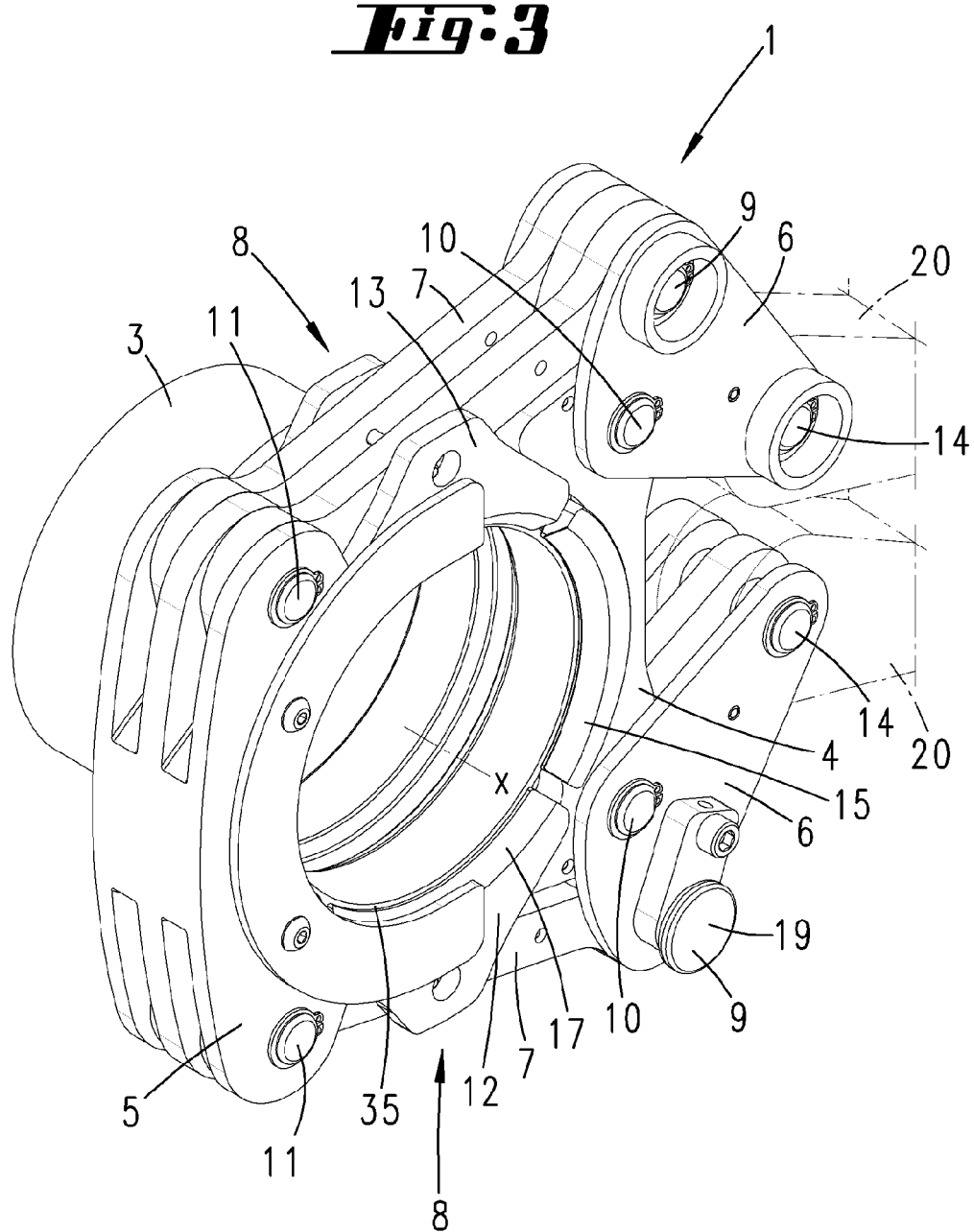

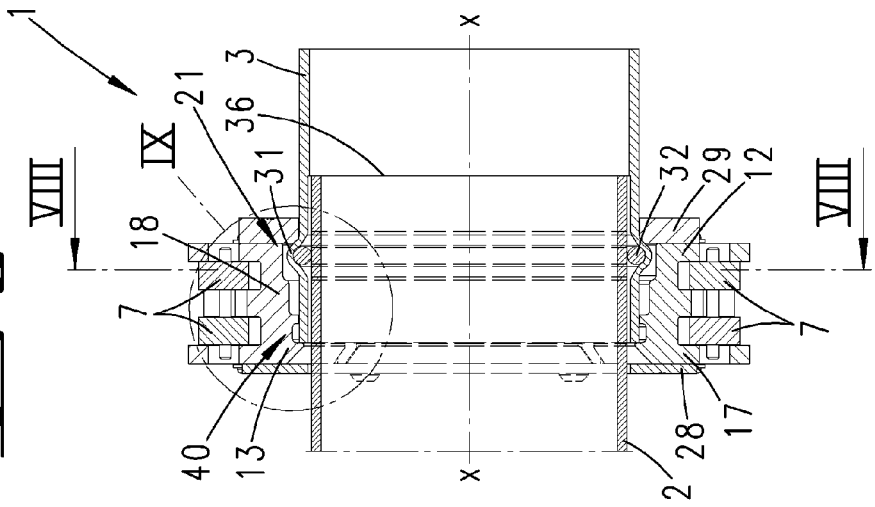
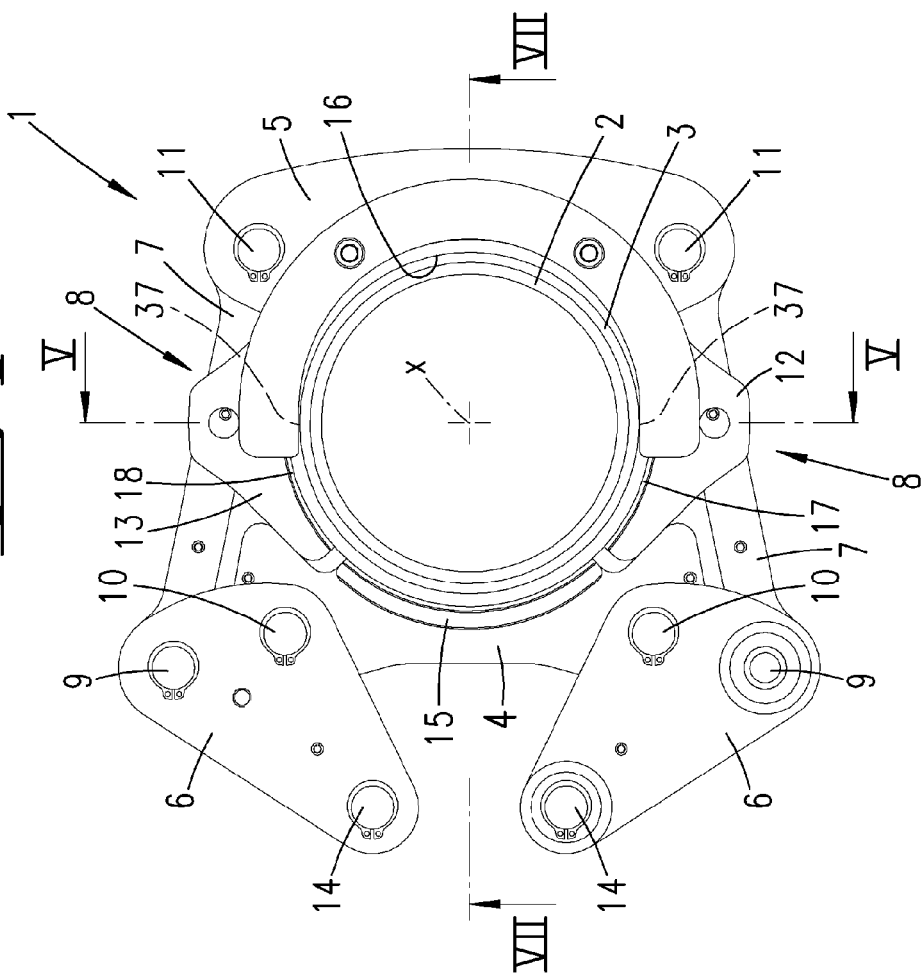

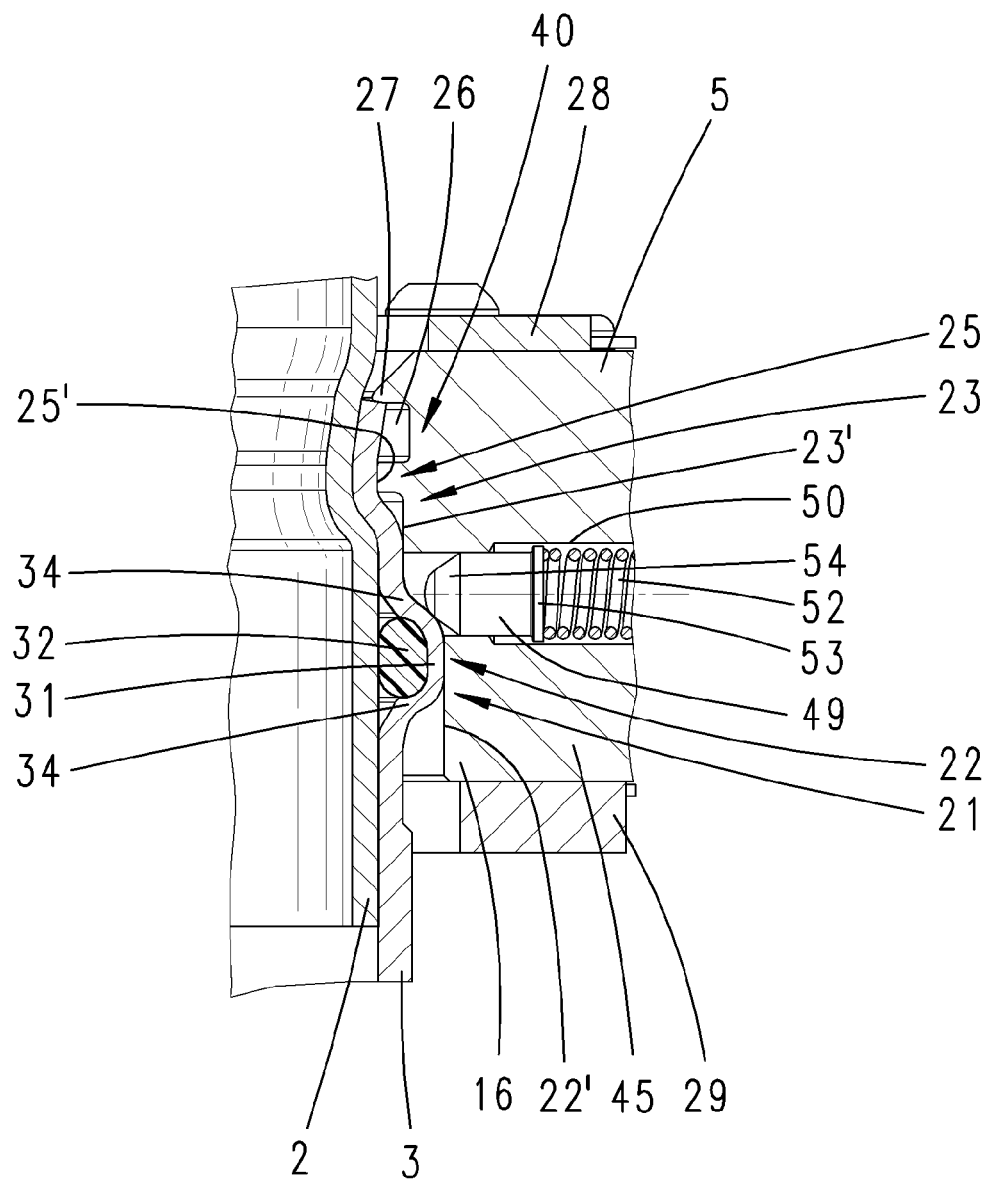

METHOD FOR THE PRESSING OF A PRESS FITTING, AND PRESSING TOOL FOR THIS PURPOSE

This application is a divisional application of Ser. No. 12/377,520, filed on Feb. 13, 2009, the contents of which are incorporated herein in its entirety.

FIELD OF THE INVENTION

The invention relates in first instance to a method or the pressing of a press fitting, with a pipe pushed into the press fitting, by means of a pressing tool, the press fitting having an encircling bead, in which an 0-ring seal is placed, the pipe ending within the press fitting and a first pressing being carried out in the region of the bead, a further pressing being furthermore carried out on the pipe-insert side of the press fitting at a distance from the bead, the further pressing leading to conicity of the press fitting and of the pipe that extends in the same direction and prevents one from being pulled off the other.

BACKGROUND OF THE INVENTION

Methods of the type in question are known. The necessary sealing of the pressing of the pipe and the press fitting is achieved by the first pressing in the region of the bead, in which the 0-ring seal located in the bead is pressed against the associated outer circumferential wall of the pipe, overlaid by the sealing ring, by being acted upon in the region of the bead by means of the pressing tool, with the sealing ring being deformed. The deforming of the sealing ring is accompanied by deforming of the region surrounding the sealing ring both of the press fitting and as a rule of the pipe. The second pressing, which is quite conceivably carried out at the same time as the first pressing, causes the press fitting and the pipe to become flared in such a way that a conicity of the combination of the press fitting and the pipe is obtained, said conicity widening counter to the direction in which one would be pulled off the other so as to achieve the effect after the pressing operation of preventing one from being pulled off the other.

A pressure connection for pipes that is produced by the generic method is known from WO 98/57086 A1. In the case of this connection, the first pressing in the region of the bead, specifically on both sides of the bead when viewed in the axial direction, achieves the effect of deforming the sealing ring while correspondingly improving the tightness of the seal and at the same time preventing pulling off.

SUMMARY OF THE INVENTION

In the light of the previously described prior art, a technical problem addressed by the invention is considered to be that of further improving a method of the type in question, in particular to make handling in the course of the pressing operation easier.

This problem is solved first and foremost by providing that the bead is axially widened in the course of the pressing by being acted upon radially from the outside. As a result of this configuration, sealing engagement of the 0-ring seal is not brought about in the same way as in the prior art by the region on the other side of the bead, optionally on both sides of the bead, being deformed, which has the effect on the sealing ring of affecting its cross-section. Rather, according to the invention, the bead that receives the sealing ring is affected directly, by being acted upon radially from the outside in the course of the pressing operation, which, with the diameter of the bead undergoing a corresponding radial reduction, results in an axial widening of the receiving space for the sealing ring that is defined on the inner wall by the bead. Accordingly, the enclosed sealing ring is also suitably deformed, to form an enlarged sealing area to which pressure is applied. Accordingly, pressure does not have to be applied to the portion of the fitting that extends to the rear of the bead, when viewed in the pushing-in direction of the pipe, which may be problematic for example in areas that are difficult to access. Thus, the method according to the invention proves to be of advantage in this respect, since action only has to be brought to bear directly upon the bead. In addition, as a result of the method proposed, correct pressing, in particular application of pressure to the enclosed seal, is also visually discernible, from the axial widening of the bead that can be seen from the outside. The radial action on the bead in the course of the pressing operation may, for example, lead to an axial widening of the bead by 1.5 to 4 times, more preferably by approximately 2 times, the original axial extent of the bead.

Thus, in a preferred development of the subject matter of the invention it is provided that, in the course of the pressing, the bead is flattened by being acted upon radially from the outside. For example, before the pressing operation, the bead is of a suitable form for receiving a cross-sectional round sealing ring. After the pressing operation, in which the bead is acted upon radially from the outside, it is deformed in such a way that the bead radius adapted to the circular diameter of the sealing ring is increased, in particular in the apex region with respect to a cross-section through the bead, in such a way that a visually perceptible flattening is obtained on the outer side of the bead and the sealing ring is deformed from the original preferred cross-sectional form of a circular disk into an oval-shaped cross-section on the inner side of the bead, the engaging sealing area being enlarged, in particular facing the inserted pipe. The flattening of the bead caused by it being acted upon radially from the outside leads to the axial widening of the bead, which can be achieved uniformly on both sides from the apex of the bead. Alternatively, the widening may also be achieved non-uniformly with respect to the apex point, even to the extent that there is only widening on one side, thus for example in the direction of the end of the fitting on the pipe-insert side.

The bead may be acted upon radially from the outside partially at a number of regions, optionally regions arranged uniformly one after the other in the circumferential direction. A preferred configuration is one in which the bead is acted upon by a cylindrical portion of the pressing tool, to obtain a circumferentially uniform radial action on the bead from the outside, so that accordingly a circumferentially uniform, uninterrupted axial widening and radial flattening of the bead is also achieved after the pressing operation has been completed.

The further pressing on the pipe-insert side, to create the effect of preventing pulling off, is carried out in a preferred configuration of the subject matter of the invention in the region of a distance from the bead in the direction of the end of the fitting on the pipe-insert side that corresponds to at least 1.5 times the height dimension or more of the unpressed bead, the height of the unpressed bead being defined according to the invention furthermore by the radial distance dimension between the unpressed inner wall of the fitting and the radially outer apex point of the unpressed bead. The axial distance of the further pressing from the bead may correspond to 2 times, 3 to 10 times the height dimension of the bead, in addition furthermore for example 3 times or 4 times or any intermediate amount, in particular in the range of tenths, thus for example 2.1 or 3.7 times the height dimension. This axial distance between the pressing regions may additionally be provided in the axial direction by a distance corresponding to 5 to 20 times the material thickness of the press fitting, thus furthermore for example with 6 to 7 times, thus also for example 5.7 or 6.3 times, the material thickness, the axial distance between the pressing regions respectively relating furthermore to an axial center of each pressing region.

At the end of the bead facing away from the end of the press fitting on the pipe-insert side, stabilizing of the pressing tool in relation to the longitudinal axis of the pipe is carried out by means of a gauge portion on the pressing tool. This gauge portion may, moreover, be used for the purpose of preventing axial widening of the bead into the side facing away from the end on the pipe-insert side. Accordingly, if appropriately disposed, the gauge portion offers rearward bead support with respect to the end on the pipe-insert side. Moreover, as a result, the fitting to be pressed is fixed in the axial direction in the course of the pressing operation. This counteracts shifting of the same, so that the pressing geometries associated with the respective zones can act in a specifically directed manner.

To form the means for preventing pulling off, in a development of the subject matter of the invention calibrating pressing is carried out between the bead pressing and the pressing on the pipe-insert side, said calibrating pressing serving in a preferred configuration for preserving the cylindrical portion of the fitting, and additionally also the portion of the pipe that is covered in this region, between the zone of the bead pressing and the zone of the pressing on the pipe insert side, even if a cross-section deviating from a circular shape initially occurs in this circumferential region in the course of the pressing.

Apart from the gauge portion provided on the bead side, a further axial alignment of the pressing tool is carried out with the aid of an engaging land engaging on an end face of the press fitting. This engaging land acts here against the free end face of the end of the fitting on the pipe-insert side. As a result of this configuration, in the course of the pressing operation the press fitting is fixed in the axial direction between the engaging land engaging against the free end edge and the gauge portion, engaging behind the bead when viewed from this free end. For further exact alignment of the pressing tool in relation to the press fitting and the pushed-in pipe to be pressed, a gauge-like grasping of the pipe is also performed on the side of the engaging land that is facing away from the bead. The gage that is also correspondingly provided for this purpose feels the outer wail of the pipe, at least over part of its circumference.

Furthermore, a radially prestressed pressing portion may be provided on the pipe-insert side of the bead. This pressing portion may be formed in a pin-like fashion, for example in the form of a spring-loaded feeler, in the region of interaction with the fitting; alternatively also extending in the form of segments of a circle in the circumferential direction of the fitting, in the manner of a gauge. It is essential here that this pressing portion is positioned in the pressing mouth, that is to say in the region that acts directly upon the fitting during the pressing operation. Such a prestressed pressing portion serves in particular as a centering aid when the pressing tool is placed onto a fitting to be pressed. In order that said fitting is not damaged during the pressing, the prestressed pressing portion yields in the course of the pressing and when the prestressing force is reached or exceeded, to adapt to the remaining pressing geometry. Only in such an end position does this pressing portion that is prestressed, in particular radially inward, and accordingly yields radially outward, optionally act upon the fitting in a pressing manner, either as an active component part of the pressing geometry or as a passive element, for example to form an axially acting supporting back. Thus, for example, the prestressed pressing portion acts in the region of the calibrating pressing, furthermore for example in a transitional region between a calibrating pressing portion and a bead pressing portion. The prestress acting upon the pressing portion is applied for example by a spring, furthermore for example by a cylindrical compression spring. Other resilient elements are also conceivable in this respect. It is also provided that plastic deformation of the fitting, in particular in the region of direct contact with the prestressed pressing portion, does not occur before said pressing portion yields radially. The prestressing force (spring force) is accordingly selected to be sufficiently great as to ensure that it causes the pressing portion to be displaced radially inward in the position in which it is unaffected by the pressing action. In turn, the prestressing force is lower than the pressing force, so that the pressing portion yields radially outward as a result of the pressing and the accompanying plastic deformation of the adjacent regions of the fitting.

The invention also relates to a pressing tool for the pressing of press fittings onto pipes, the pressing tool having at least two pressing jaws with a first pressing geometry, adapted to a bead formed in the press fitting, to form a bead pressing portion, and a second pressing geometry, spaced apart axially from said first geometry, to form a cone pressing portion, which second pressing geometry serves for preventing the pressed combination of the press fitting and the pipe from being pulled off one another, the second pressing geometry being formed on the pipe-insert side of the bead with respect to the combination of the press fitting and the pipe.

Pressing tools of the type in question are known, for example for producing pressure connections for pipes according to WO 98/57086 AI, mentioned at the beginning.

In order to improve a pressing tool of the type in question, in particular in terms of handling, while maintaining functional reliability of the pressed connection to be produced, it is proposed that the first pressing geometry, associated with the bead, leaves the bead space, at least in one direction, for the axial widening of the bead. Accordingly, in the course of the pressing operation, a re-shaping of the bead is achieved such that it widens in an axial direction while the radial dimension is reduced, this taking place furthermore with corresponding deformation of the 0-ring seal that is received on the inner side of the bead and in turn engages against the outer wall of the pipe in a sealing manner over an engaging area correspondingly enlarged in the axial direction after the pressing operation. The deformation of the bead takes place here by it being directly acted upon radially from the outside by way of the corresponding pressing geometry of the tool. This geometry may be shaped in such a way that the widening of the bead with respect to a cross-section through the bead is obtained on both sides of an apex zone of the bead, thus furthermore for example uniformly on both sides. In a preferred configuration, the pressing geometry is formed such that the axial widening takes place at least predominantly only in one direction, thus furthermore preferably in the direction of the end of the press fitting on the pipe-insert side. The pressing in the region of the bead, and the accompanying effect of the enclosed sealing ring being acted upon in the direction of the sealing position, is visible from the outside after the pressing operation as a result of the proposed pressing geometry, because of the changed outer shape of the bead. This provides a means of visually checking that the pressing operation, in particular pressing in the sealing zone, has been carried out properly.

In a development, a radially prestressed pressing portion is provided in the pressing geometry, which pressing portion yields radially in the course of the pressing and when the prestressing force is reached, to adapt to the remaining pressing geometry, and may be formed in a pin-like fashion, in particular to act in a centering manner when the pressing tool is put in place. In order that the fitting is not damaged by this pressing portion during the pressing, the latter is retracted radially outward after the prestressing force is overcome, after which the end region of the pressing portion that is facing the fitting is still quite capable of having an active and/or passive effect on the pressing.

The invention also relates to a pressing tool for the pressing of press fittings onto pipes, the pressing tool having at least two pressing jaws and a pressing geometry, for example to form a bead pressing portion.

In order to improve such a pressing tool further in terms of handling, it is provided that a radially prestressed pressing portion is provided in the pressing geometry, which pressing portion yields radially in the course of the pressing and when the prestressing force is reached, to adapt to the remaining pressing geometry. This pressing portion may be formed in a pin-like fashion, for example in the form of a spring-loaded feeler, in the region of interaction with the fitting; alternatively also extending in the form of segments of a circle in the circumferential direction of the fitting, in the manner of a gauge. It is essential here that this pressing portion is positioned in the pressing mouth, that is to say in the region that acts directly upon the fitting during the pressing operation. Such a prestressed pressing portion serves in particular as a centering aid when the pressing tool is placed onto a fitting to be pressed. In order that said fitting is not damaged during the pressing, the prestressed pressing portion yields in the course of the pressing and when the prestressing force is reached or exceeded, to adapt to the remaining pressing geometry. Only in such an end position does this pressing portion that is prestressed, in particular radially inward, and accordingly yields radially outward, optionally act upon the fitting in a pressing manner, either as an active component part of the pressing geometry or as a passive element, for example to form an axially acting supporting back. The bias acting upon the pressing portion is applied for example by a spring, furthermore for example by a cylindrical compression spring. Other resilient elements are also conceivable in this respect. It is also provided that plastic deformation of the fitting, in particular in the region of direct contact with the prestressed pressing portion, does not occur before said pressing portion yields radially. The prestressing force (spring force) is accordingly selected to be sufficiently great as to ensure that it causes the pressing portion to be displaced radially inward in the position in which it is unaffected by the pressing action. In turn, the prestressing force is lower than the pressing force, so that the pressing portion can yield radially outward as a result of the pressing and the accompanying plastic deformation of the adjacent regions of the fitting.

Thus, in a development of the subject matter of the invention it is provided that the first pressing geometry leaves the bead space, at least in one direction, for the flattening of the bead, this being achieved by acting on the bead, in particular radially, wherein, when viewed in a cross-section of the bead, the defined bead radius, adapted to the cross-sectional diameter of the enclosed sealing ring, is increased, in particular in the apex region, by as much as to a radius dimension that corresponds to a multiple of the original, radial dimension, so that ultimately even a flat cylindrical surface area on the outer circumferential side can be obtained in the apex region of the bead. This is achieved in particular by a cylindrical portion which forms the first pressing geometry. When viewed in the axial direction, this cylindrical portion is formed with such a length that the space for the axial widening of the bead is provided.

At the end of the bead that is facing away from the end of the press fitting on the pipe-insert side, a gauge portion is formed on the pressing tool. This gauge portion serves primarily for stabilizing the pressing tool in relation to the longitudinal axis of the pipe, as a result of which a relative displacement of the press fitting in the axial direction is also counteracted in the course of the pressing operation. In an advantageous way, the first pressing geometry is formed such that the gauge portion prevents the axial widening of the bead on the side of the bead that is facing away from the end on the pipe-insert side. Accordingly, in the course of the pressing operation, the gauge portion offers a rearward support-a stop- for the first pressing geometry, so that the bead acted upon radially from the outside by the first pressing geometry can axially widen only in one direction, namely in the direction of the end of the press fitting that is on the pipe-insert side. The gauge portion is formed furthermore such that it serves merely for stabilizing or guiding the pressing tool in relation to the press fitting; no pressing forces in the actual sense are transmitted to the pipe fitting or to the inserted pipe, however. Nevertheless, in a preferred configuration, the gauge portion is formed with such stability that it can absorb in a trouble-free manner the forces acting in the axial direction upon the adjacent bead while the latter is being acted upon radially, to restrain the tendency for the bead to be widened in the direction of the gauge. Preventing the bead from widening axially in the direction of the end facing away from the insert side is achieved in an alternative embodiment by engaging elements formed on the gauge portion and facing in the direction of the bead. The gauge portion accordingly does not act directly on the bead, but rather indirectly by way of the engaging elements. A number of engaging elements may be provided over the circumferential length of the gauge portion, preferably spaced apart uniformly in relation to one another, more preferably two thereof are positioned diametrically opposite one another. A kind of point support is accordingly achieved. An engaging element is adapted to the contour of the bead, for example has a conical surface area facing a bead flank. Thus, furthermore, where it faces the bead, the engaging element may be shaped in a cap-like fashion.

The second pressing geometry, on the pipe-insert side, for forming the means for preventing pulling off, is preferably provided in a region which is at a distance from the bead in the direction of the end of the fitting on the pipe-insert side that corresponds to at least 1.5 times the height dimension or more of the unpressed bead. Thus, for example, when viewed in the axial direction, the second pressing geometry is spaced apart from the first pressing geometry, acting upon the bead, by an axial extent which corresponds to 2 to 10 times, furthermore for example 4, 5 or 6 times, the radial height of the bead, thus furthermore also for example 2.1 times or 3.9 times or 4.7 times. The axial dimension relates in each case to the central portion of the respective pressing geometry when viewed in the axial direction.

Formed between the bead pressing portion of the pressing tool and the cone pressing portion of the pressing tool is a calibrating pressing portion, which is provided with regard to the radial distance between the bead pressing portion and the cone pressing portion, wherein furthermore the cone pressing portion leaves a radial inner space that is reduced with respect to the bead pressing portion, and the calibrating pressing portion leaves a radial inner space of a diameter which is of a size between that of the cone pressing portion and the bead pressing portion, thus furthermore of a size approximately midway between these diameters. The calibrating pressing portion serves for calibrating the region in the form of a portion of pipe between the pressing portions of the press fitting, so that even after pressing, a preferably strictly cylindrical portion of the fitting is obtained in this region. For this purpose, the calibrating pressing portion has a cylindrical portion, which, in particular toward the end of the pressing operation, acts against the associated portion of the wall of the pipe fitting, optionally with a shape-correcting effect.

When viewed in the axial direction, a transitional portion between the bead pressing portion and the calibrating pressing portion is obtained. This is formed in its axial width so as to correspond approximately to the axial width of the cone pressing portion, wherein furthermore the width of the cone pressing portion corresponds approximately to the difference between the radii of the cone pressing portion and the calibrating pressing portion. More preferably, the transitional portion between the calibrating pressing portion and the cone pressing portion is not formed as a sudden transition or a step-like transition, but rather as a rounded transition. Alternatively, in particular in the case of pressing tools for the pressing of fittings with small diameters, the axial width of the transitional portion is selected to be smaller than the axial width of the cone pressing portion. Thus, the axial width of the transitional portion corresponds for example to 0.3 to 0.7 times, furthermore for example 0.5 times, the axial width of the cone pressing portion. In a preferred configuration, the radially prestressed pressing portion is clamped into this transitional portion in the pressing state, thus, by way its end face facing radially inward, at least partially forming the contour of the transitional portion.

Preferably two diametrically opposite prestressed pressing portions are provided, the free radially inwardly facing ends of which are conically formed, for support on the facing bead flank. The bead flank opposite this is flanked by the gauge portion or by the engaging elements secured to the gauge portion. If such engaging elements are provided, preferably two such elements are disposed diametrically opposite one another, furthermore offset by 90° in relation to the prestressed pressing portions. The bead is in any case axially engaged on both sides for the centering of the pressing tool.

The cylindrical portion of the bead pressing portion has an axial length which corresponds to a multiple of the axial length of the cone pressing portion, thus furthermore preferably a length 2 to 5 times, more preferably 3 times or else 2.4 or 3.2 times, the length of the cone pressing portion. The axial length of the calibrating pressing portion may furthermore correspond to the axial length of the bead pressing portion, resulting in the cylindrical portion of the calibrating pressing portion having an axial length which corresponds to a multiple of the axial length of the cone pressing portion. The latter in turn has an axial length which corresponds to 0.5 to 5 times the wall thickness of the press fitting, thus furthermore for example 1 times or 3 to 4 times, furthermore 1.7 or 4.2 times, the wall thickness; furthermore, in the case of a configuration given by way of example for the pressing of a pipe having a diameter of for instance 4 inches, the wall thickness of the pipe fitting is 2.5 mm, this furthermore with the assumption of an O-ring seal with a circular cross-section with a diameter of 5 mm and corresponding radial adaptation of the bead.

For the axial alignment at the end of the pressing tool that is facing the cone pressing portion, an engaging land is provided, engaging against an end face of the press fitting. To adjust the pressing tool and to stabilize the same in the course of the pressing operation, this engaging land acts against the free end face of the pipe fitting at the end on the pipe-insert side, as a result of which the press fitting is axially confined between this engaging land and the gauge portion engaging the bead from the rear. Also provided, on the side of the engaging land that is facing away from the bead, is a second gauge portion, which acts against the outer circumferential surface of the pipe radially from the outside.

The first gauge portion, provided at the end of the bead that is facing away from the end of the press fitting on the pipe-insert side, may be disposed such that it partially encloses the press fitting, thus furthermore by forming a semi-cylindrical portion. In a preferred configuration, the second gauge portion, provided on the side of the engaging land that is facing away from the bead, is also of a semi-cylindrical form; furthermore, optionally, the two gauge portions do not necessarily engage on the back of the bead or on the pipe over the full surface area of their inner semicircular contour throughout the entire pressing operation. Rather, for example, at the beginning of the pressing operation, point supports, in particular diametrically opposite supports, of the gauge portions may be provided in the pressing tool purely for stabilizing the combination of the press fitting and the pipe, from which supporting points the interacting surface areas of the gauge portion and the portion of the fitting or the portion of the pipe rise and come toward one another in the circumferential direction in the course of the pressing operation, so that toward the end of the pressing operation the gauge portions, in particular the gauge portion on the bead side, engage(s) said bead over its entire circumferential line.

The first gauge portion, associated with the rear of the bead, has an axial longitudinal extent which corresponds to 1.5 times or more the wall thickness of the press fitting, or approximately 1 to 3 times the axial length of the bead pressing portion, resulting in sufficient stability of the gauge portion.

Correspondingly, it is provided furthermore with an axial length which corresponds to a multiple, thus for example 2 to 5 times, preferably approximately 3 times, the axial length of the cone pressing portion.

In a further preferred configuration, it is provided that the radial dimension of the calibrating pressing portion is set back from the radial dimension of the cone pressing portion by 0.5 times or more the wall thickness of the fitting to be pressed. Thus, in a preferred configuration, this radial spacing between the pressing areas of the calibrating pressing portion and the cone pressing portion corresponds approximately to the wall thickness of the fitting. Finally, it is provided that the radial dimension of the bead pressing portion is increased with respect to the radial dimension of the calibrating pressing portion by 0.1 to 0.9 times the height of the bead of the unpressed fitting. Thus, for example, the radial offset between the pressing areas of the bead pressing portion and the calibrating pressing portion in the case of pressing tools for the pressing of fittings with large diameters is selected to be approximately 0.1 to 0.4 times, furthermore approximately 0.2 times, the height of the unpressed bead, furthermore approximately 0.5 to 0.8 times the wall thickness of the fitting, while in the case of smaller fitting diameters it is selected to correspond approximately to 0.5 to 0.8 times, furthermore approximately to 0.6 times, the height of the bead, or approximately to 1.0 to 2.0 times, furthermore approximately 1.5 times, the thickness of the fitting.

All of the aforementioned dimensions or dimensional ranges or relative values or ranges of relative values relate to the values specified and to intermediate values between the minimum and maximum values, thus in particular also furthermore to intermediate values in the range of tenths, even when this is not explicitly stated respectively in the case of individual values.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 shows, in perspective view, the pressing tool in the state in which it has been put in place and is ready for pressing, with the fitting inserted but without the pipe;

FIG. 4 shows a side view toward the pressing tool with the fitting and the pipe in place, without the device acting on the pressing tool for the pressing operation;

FIG. 5 shows the section along the line V-V in FIG. 4;

FIG. 20 shows the enlarged detail as per FIG. 18, in the pressing position.

DETAILED DESCRIPTION OF THE ILLUSTRATED EMBODIMENTS

Figure 1:
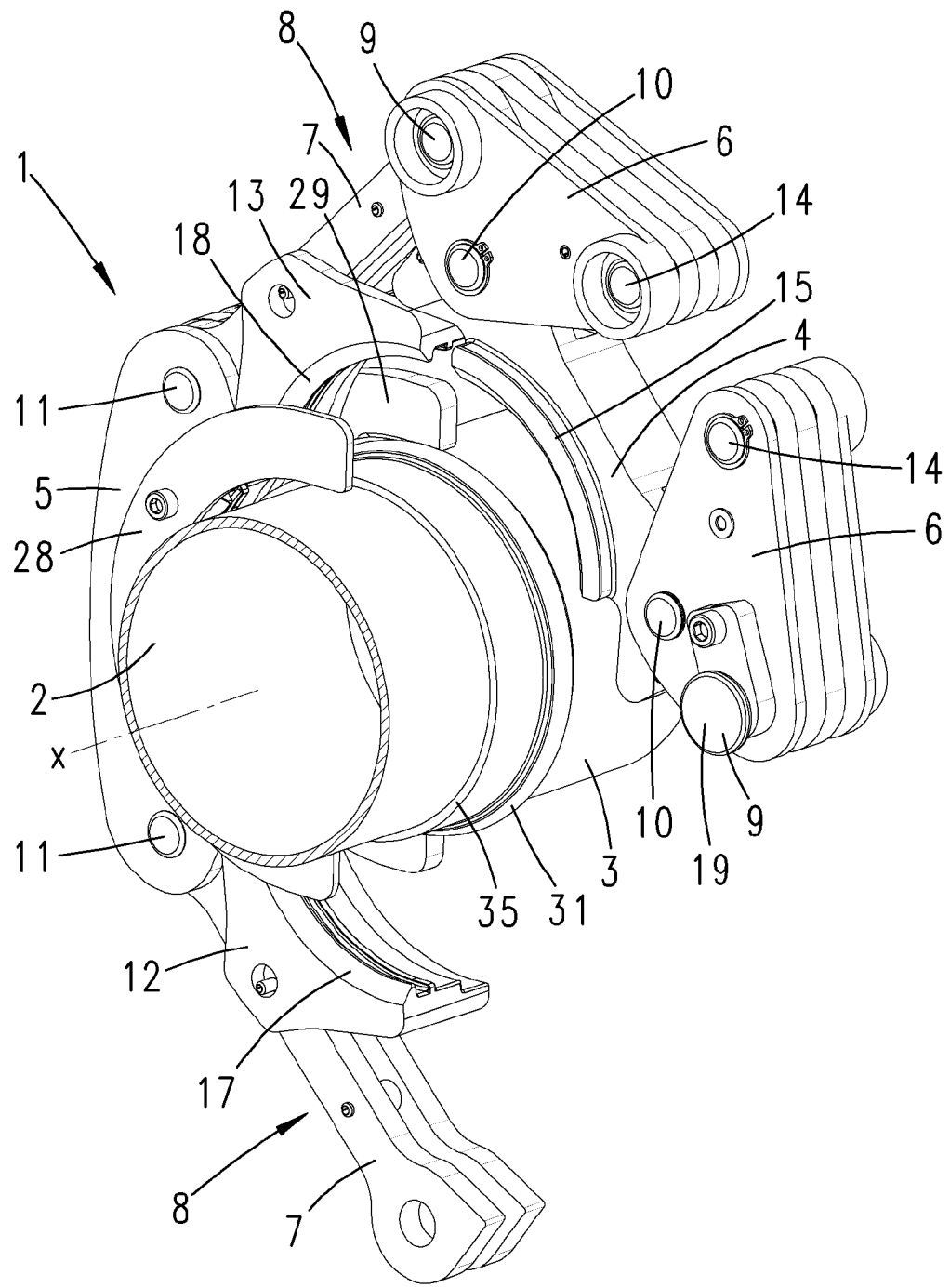
FIG. 1 shows a perspective view of a pressing tool according to the invention in the open position, placed against a fitting to be pressed with a pipe pushed in, for a first embodiment.
Figure 2:
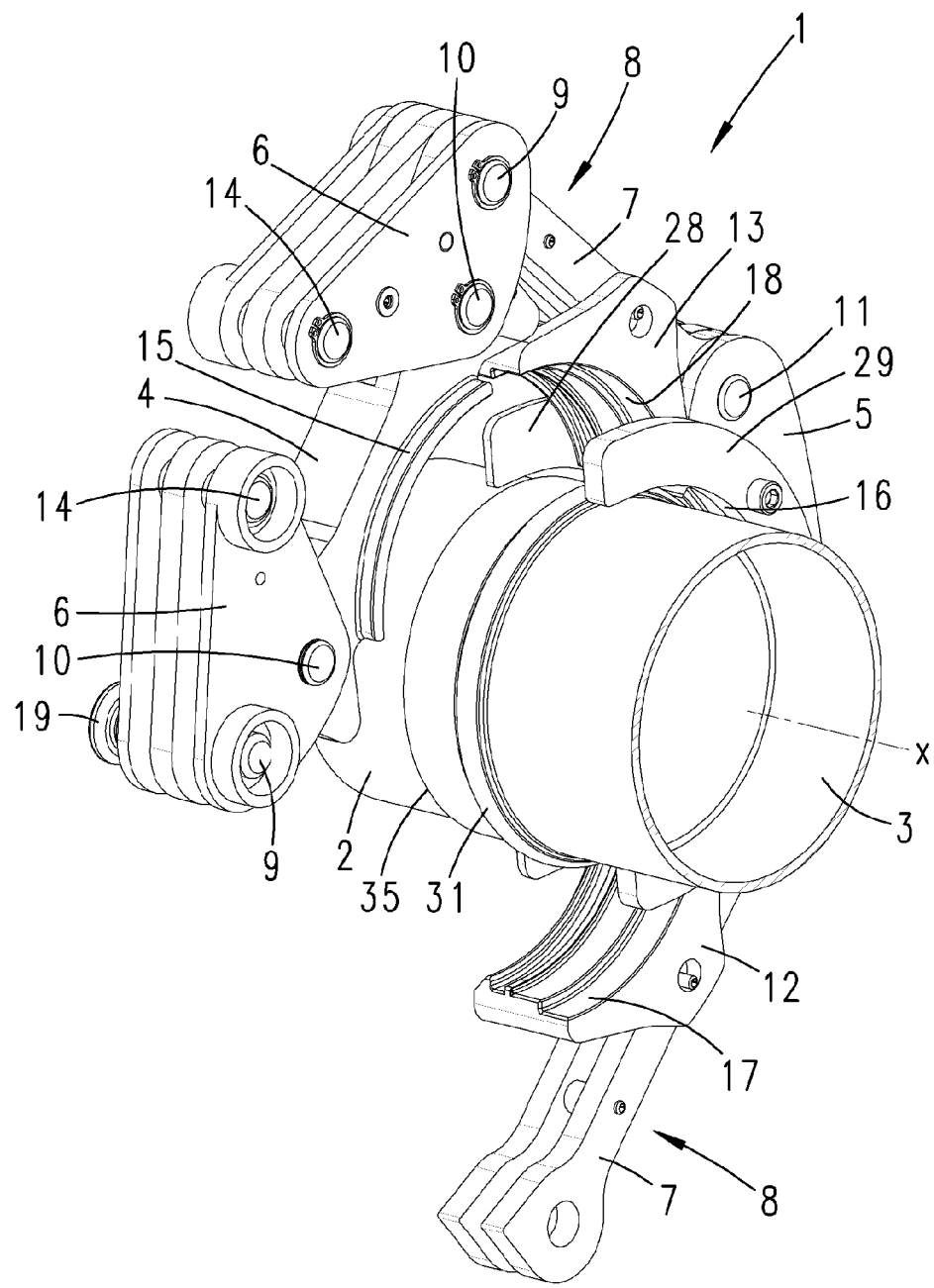
FIG. 2 shows a further perspective view according to the situation in FIG. 1.
Figure 7:
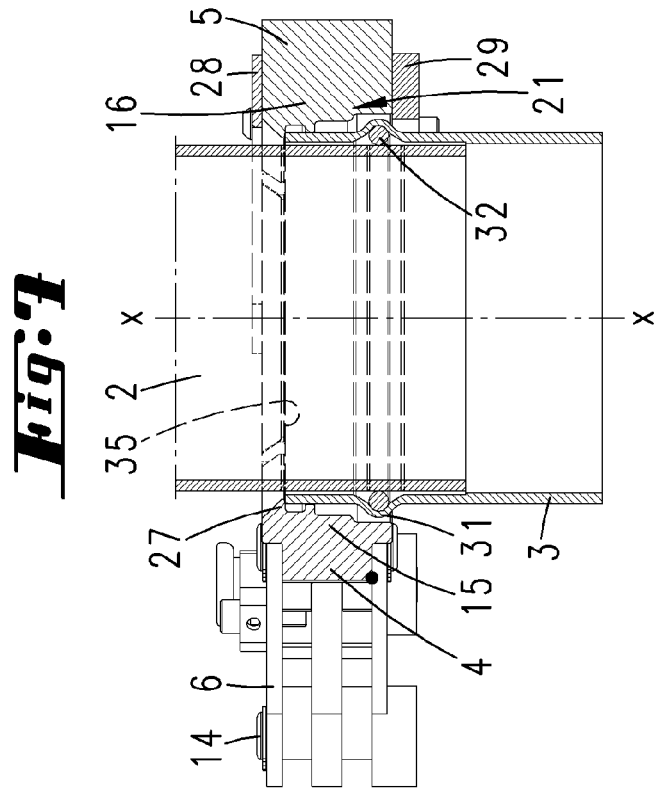
FIG. 7 shows the section along the line VII-VII in FIG. 4.
Figure 6:
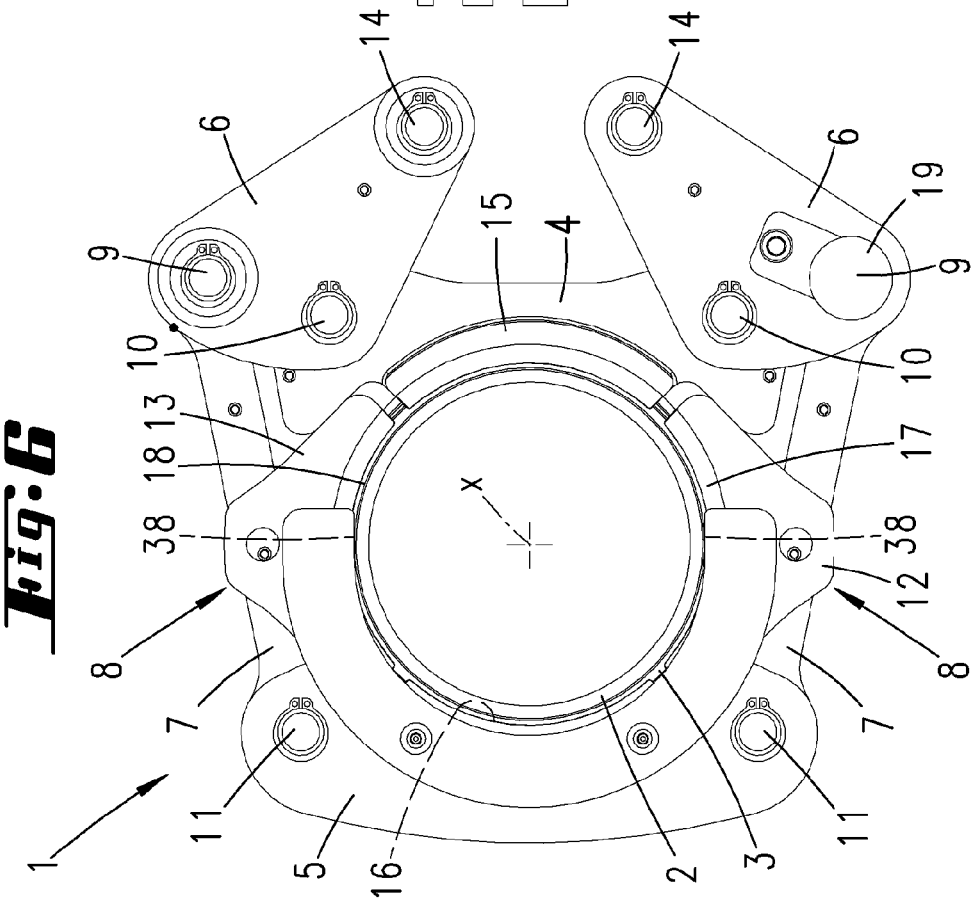
FIG. 6 shows a view toward the pressing tool that is a rear view in relation to that shown in FIG. 4.
Figure 8:
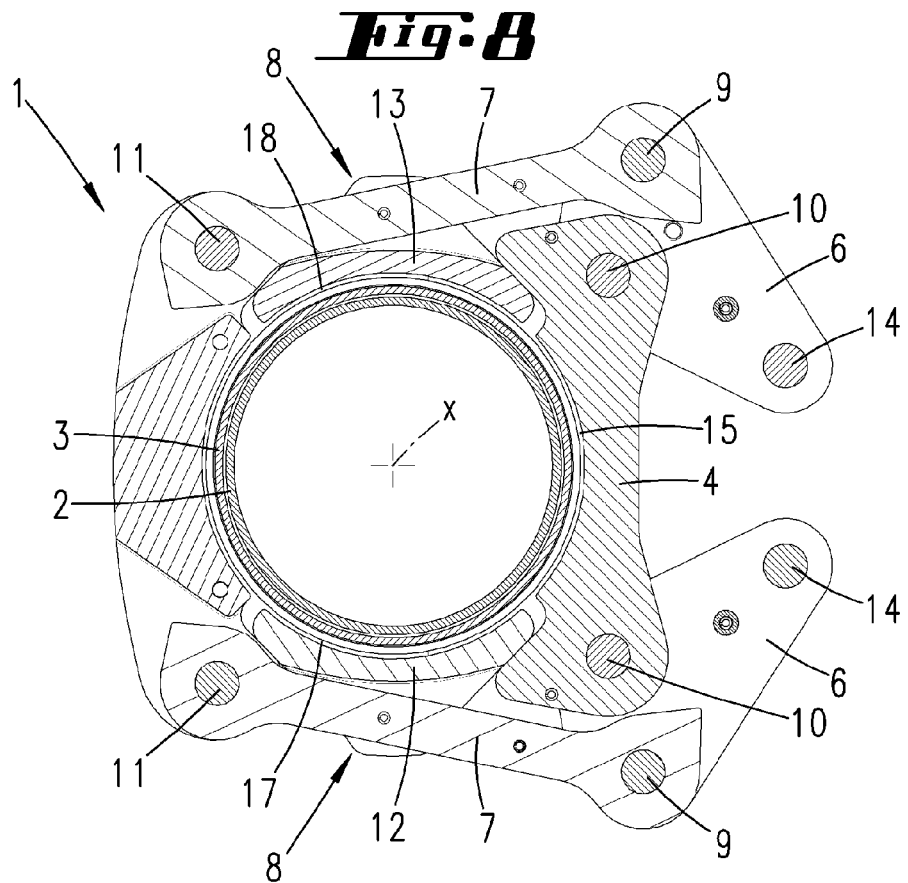
FIG. 8 shows the section along the line VIII-VIII in FIG. 5.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

FIG. 1 shows, in perspective view, a first embodiment of the pressing tool 1 according to the invention, shown with tubular workpieces which are to be pressed together inserted in it. As can be seen in conjunction with the following figures, these workpieces are a pipe 2, which has been inserted into a press fitting 3. The workpieces have a common central longitudinal axis x.

In the case of the exemplary embodiment represented, the pressing tool 1 is a kind of pressing chain, as known for example from EP 1455969 B1. The content of this patent is hereby incorporated in full in the disclosure of the present invention, including for the purpose of incorporating features of this patent in claims of the present invention.

The pressing tool 1 of the embodiment shown comprises four pressing links, which take part in an interacting manner in the operation of pressing the workpieces. For this purpose, the pressing tool 1 firstly has two pressing links 4, 5, which lie opposite one another in the circumferential direction and, in order to change a pressing cross-section, can be displaced with respect to one another by means of two toggle levers 8, which each include a pivot lever 6 formed as an angle lever and a pivot lever 7. A pivot lever 6 is in each case connected to a pivot lever 7 by means of a toggle pivot 9. The pivot lever 6 has an outer pivot 10, which is connected to the pressing link 4.

At its opposite end, the pivot lever 7 has an outer pivot 11, which is connected to the pressing link 5. In view of the discernible axially symmetrical arrangement of the two toggle levers 8, the same reference numerals are chosen for corresponding elements here and below. In the respective circumferential-angle region of a pivot lever 7, which has a greater length than the pivot lever 6, there is in each case a further pressing link 12, 13, with the pressing links 12, 13 likewise lying opposite one another with respect to the pressing cross-section.

The pressing links 4, 5 are not connected to the pressing links 12, 13 by means of pivots, but rather are merely held captively on the pivot levers 7 and guided by means of sliding guides on the pressing links 4, 5. This means that the pressing links uniformly enclose the pressing cross-section, or the workpieces to be pressed, over the entire circumference even before the pressing operation commences.

Furthermore, force-introduction elements 14 for introducing force outside the outer privet are provided on the pivot levers 6. In the exemplary embodiment represented, the pressing links 5, 12 and 13 and the pivot levers 6 each have three plate regions which are spaced apart from and parallel to one another, with parallel gaps located between them. By contrast, the pressing link 4 and the pivot levers 7 each have two comparable spaced-apart plate regions, which are dimensioned and spaced apart in such a manner that they can engage in the gaps of the pressing links 5, 12 and 13 and the pivot levers, and so mutual penetration of the links is made possible. With regard to the pressing links 4, 5 and 12, 13, the plate regions are connected to one another by way of pressing jaws 15, 16, 17 and 18 to form a unit, resulting in a stable configuration. The pivot connections between the pressing links 4, 5 and the pivot levers 6, 7 explained above are made through end bores which penetrate through one another in the assembled state and through which the cylindrical pins are fitted and held at their ends by securing rings. In the exemplary embodiment shown, it is provided that the pressing chain can be opened at the toggle pivot 9 of the upper toggle lever by a coupling bolt 19 being displaceable into a release position.

The pressing operation with corresponding reduction of the pressing cross-section is achieved by pressing jaws in the form of pressing tongs, which act on the pressing tool 1, are disposed on a hydraulically acting pressing device (not represented) and are part of pressing levers disposed in a pivotally movable manner in a clamping device. The pressing jaws 20 are positively connected to the pivot levers 6 by means of the force-introduction elements 14. In the course of a pressing operation, the pressing jaws 20 are actuated from the rear at the ends on the lever side in such a way that the pressing jaws 20 close in the manner of tongs, which results in a reduction in the distance between the force-introduction elements 14. Pivoting of the pivot levers 6, 7 has the effect that the pressing cross-section is reduced in the region of the pressing jaws 15 to 18 to perform pressing.

The pressing jaws 15 to 13 are identically formed radially inwardly, facing the workpieces to be pressed, and accordingly have the same pressing geometries in a cross-section. Such a cross-section through a pressing jaw is represented in FIG. 9.

Figure 9:
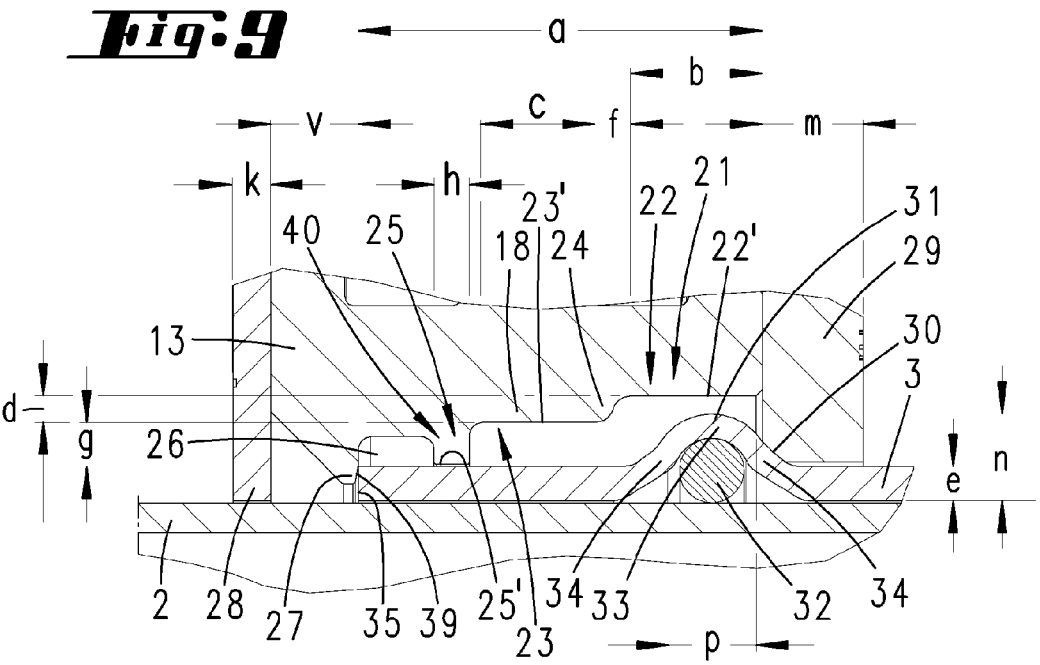
FIG. 9 shows the enlargement of the region IX in FIG. 5.
Figure 10:
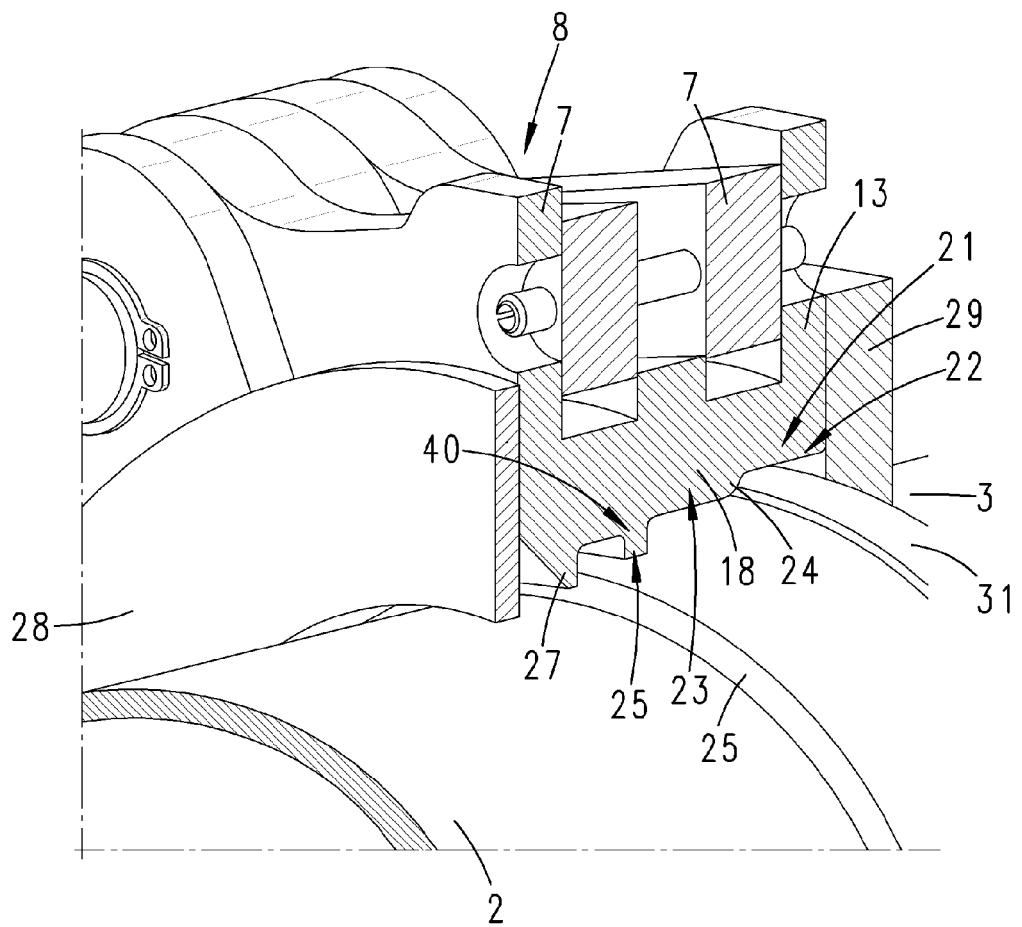
FIG. 10 shows the detail as per FIG. 9 in a perspective view.
Figure 11:
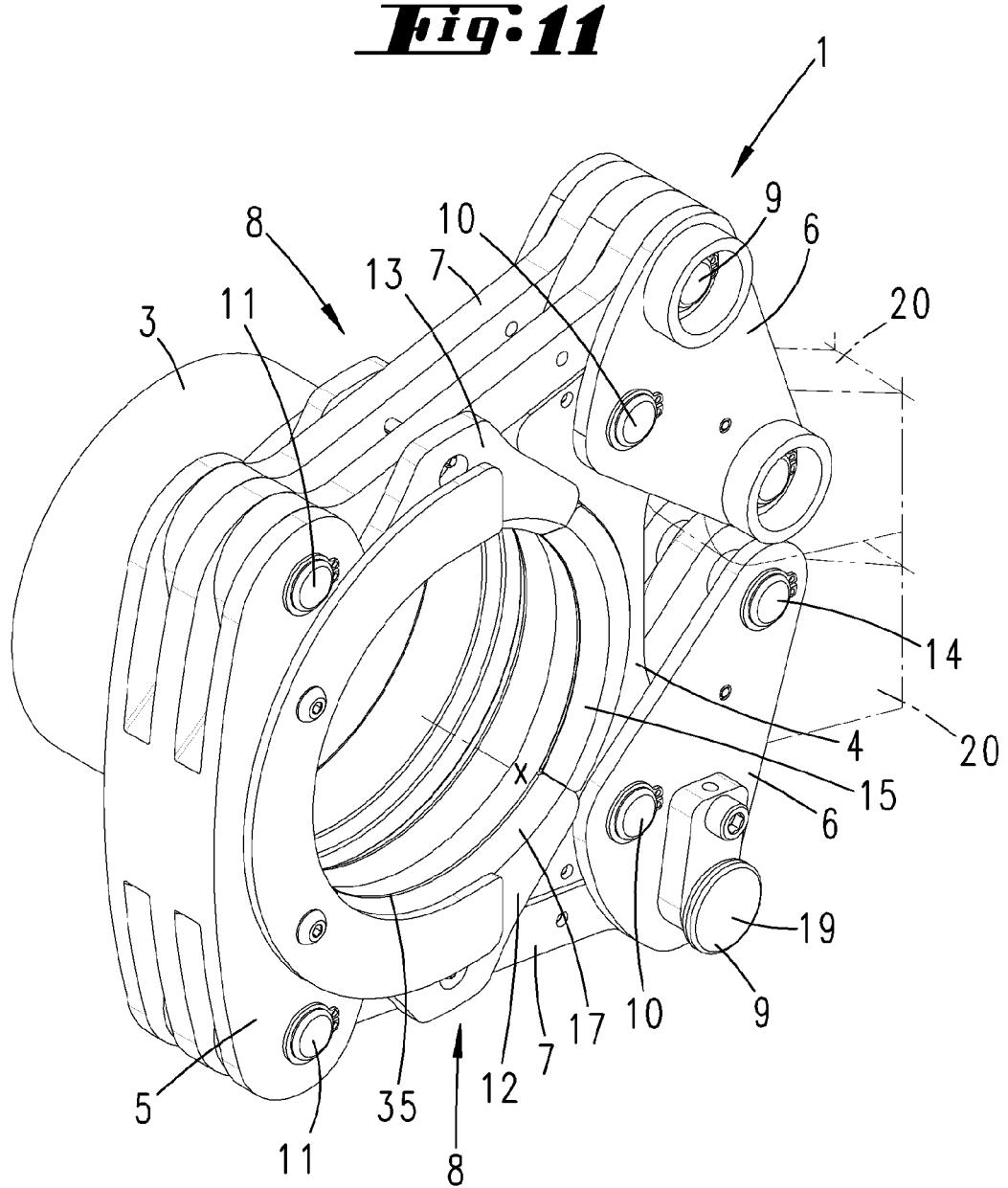
FIG. 11 shows a perspective view corresponding to FIG. 3, but for the pressing position.

In the cross-section according to the representation in FIG. 9, each pressing jaw 15 to 18 has substantially three different portions of pressing geometries disposed one after the other in the axial alignment of the respective pressing jaw, thus firstly, starting from one axial end of the jaw cross-section, a first pressing geometry 21, which is formed by a bead pressing portion 22 formed as a cylindrical portion. This extends approximately over one third of the overall length a, measured in the direction of the axis x, of the pressing cross-section of the pressing jaw 15 to 10 acting on the press fitting 3. Thus, in the exemplary embodiment represented, with a chosen axial length a of the overall pressing geometry acting on the press fitting 3 of approximately 30 mm, a length of extent b of the cylindrical portion forming the bead pressing portion 22, measured in the same direction, of approximately 10 mm is obtained.

Formed axially alongside the bead pressing portion 22, approximately midway along the overall axial length a of the effective pressing geometry, is a calibrating pressing portion 23. This is also formed by a cylindrical portion, which has the result, in a cross-section according to FIG. 9, of providing said calibrating pressing portion and also the bead pressing portion 22 with a respective pressing-action wall 22' and 23' extending parallel to the axis x.

The calibrating pressing portion 23 has a length c, measured in the axial direction, which corresponds approximately to the length b of the bead pressing portion 22. Thus, the calibrating pressing portion 23 is also provided with approximately one third of the overall length a of the effective pressing cross-section, thus furthermore in the exemplary embodiment represented with a length c of approximately 10 mm.

As can also be gathered in particular from the sectional representation in FIG. 9, the effective areas 22' and 23' of the pressing portions 22 and 23 extend at different radius lines. Thus, the cylindrical portion forming the bead pressing portion 22 is provided with a greater diameter than the cylindrical portion for forming the calibrating pressing portion 23. In the exemplary embodiment represented, the radius oversize d between the areas 23' and 22' corresponds approximately to one fifth of an axial length of extent b or c of the pressing portions 22 and 23. Furthermore, this radius oversize d corresponds approximately to the material thickness (dimension e) of the fitting 3 to be pressed.

In the exemplary embodiment represented, the pressing tool 1 and the pressing jaws 15 to 18 are designed for pressing a pipe 2 having a 4-inch diameter and a correspondingly dimensioned fitting 3. In the case of such 4-inch pipes, fittings 3 generally have a wall thickness e of approximately 2.5 mm.

When viewed in the axial direction, formed between the bead pressing portion 22 and the calibrating pressing portion 23 is a transitional portion 24. This forms a rounded step of the radius transition between the areas 22' and 23'. The axial width f of this transitional portion 24 corresponds approximately to the radius oversize d between the areas 22' and 23', is furthermore adapted to correspond to the material thickness of the fitting 3 to be pressed, accordingly has in the exemplary embodiment represented an extent f of approximately 2.5 mm.

In this exemplary embodiment, the difference in radial dimension g between the pressing areas 23' and 25' of the calibrating pressing portion 23 and the cone pressing portion 25 corresponds approximately to the material thickness e of the fitting 2, accordingly approximately 2.5 to 3 mm, while the difference in radial dimension d between the pressing areas 22' and 23' of bead pressing portion 22 and calibrating pressing portion 23 corresponds to approximately 0.2 times the height n of the unpressed bead 31.

On the side facing away from the bead pressing portion 22, the calibrating pressing portion 23 is followed by a second pressing geometry 40 in the form of a cone pressing portion 25. This is also provided radially inward with a cylindrical area 25', aligned concentrically in relation to the axis x. The cylinder diameter defining this area of action is reduced with respect to the diameter defining the area 23' of the calibrating pressing portion 23, thus for instance by the extent of the material thickness (dimension e) of the fitting 3 to be pressed. Thus, in the exemplary embodiment represented, a difference in radial dimension g between the area 25' and the area 23' of approximately 2.5 to 3 mm is obtained, which results in a difference in radial dimension between the cone pressing area 25' and the bead pressing area 22' approximately in the range of twice the material thickness.

The axial width h of the cone pressing portion 25 likewise corresponds approximately to the material thickness of the press fitting 3, thus in the exemplary embodiment represented is approximately 2.5 to 3 mm. Starting approximately from the surface of the calibrating pressing portion 23, the cone pressing portion 25 is formed in the manner of a land facing radially inward, with an axial extent which corresponds approximately to the dimension of the radial projection with respect to the calibrating area 23'. To the rear of the cone pressing portion 25—with respect to the calibrating pressing portion 23—a yielding space 26 is left over the remaining length of the overall pressing geometry acting on the press fitting 3. The cylindrical wall of said space is provided with a radial dimension which corresponds approximately to 0.75 times the difference in radial dimension g between the cone pressing area 25' and the calibrating pressing area 23'.

In cross-section, at one end the pressing jaws 15 to 18 go beyond the pressing geometry substantially acting on the press fitting 3, to form an engaging land 27 formed in the region of the end of the yielding space 26 that is facing away from the cone pressing portion 25. This land reaches radially inward over the plane defined by the cone pressing area 25', to interact with a facing end face 35, on the pipe-insert side, of the inserted press fitting 3.

On the cheek surface of the jaw portion forming the engaging land 27, and correspondingly on the side of the engaging land 27 that is facing away from the bead 31, a gauge portion 28 is fixed. By contrast with the three-part configuration of the pressing jaws, this gauge portion is formed as one part, forming a semicircular ring in plan view. It is secured to the pressing link 5, segments of the semicircle of this gauge portion 28 protruding beyond the pressing links 12 and 13 in the prepared position according to FIG. 3.

Given a material thickness k, measured in the axial direction, which, at 2.5 mm in the exemplary embodiment represented, corresponds approximately to the material thickness of the pipe fitting 3, an inner radius of the annular gauge portion 28 that is adapted to the outside diameter of the pipe 2 to be pressed is provided. Accordingly, both in the preparation position and in the pressing position, the facing end face of the gauge portion 28 rests at least partially on the facing circumferential portion of the pipe 2, for stabilizing and radially supporting the pipe 2.

The axial distance v of the gauge portion 28 from the area of action of the engaging land 27, and consequently in the pressing situation from the supporting end face 35 of the wall of the fitting, is dimensioned in the exemplary embodiment represented as approximately 3 times the thickness k of the gauge portion 28. Thus, the distance v in the exemplary embodiment represented is approximately 7.5 mm.

Also at the other end of the overall pressing geometry, that is to say associated with the cheek surface of the pressing link 5 that is facing away from the gauge portion 28, a further gauge portion 29 is secured. This is also formed as a semicircular ring in plan view, with free ends extending partially over the pressing links 12 and 13. Compared with the gauge portion 28, the gauge portion 29 is thickened, accordingly has, when viewed in the axial direction, an extent m which corresponds to approximately three times the thickness dimension k of the gauge portion 28, thus furthermore approximately to three times the dimension of the material thickness e of the fitting 3 to be pressed.

The radial inner dimension of the gauge portion 29 is adapted to the outer diameter of the fitting 3 to be pressed, so that, at least in the pressing state, the gauge portion 29 engages with its semicircular shape the associated wall portion of the fitting 3. This also has the effect of initially achieving a radial support of the fitting 3 and also of the pipe 2 lying in the fitting 3.

On the inner side of the cheek, that is to say facing the pressing geometry, in particular in the region of the bead pressing portion 22, the gauge portion 29 forms a conical surface area 30. The gauge portion 29 is supported by way of this conical surface area 30 on a facing flank 34 of an encircling bead 31, formed on the fitting 3.

The bead 31 of the press fitting 3 serves for receiving an inner O-ring seal 32, which preferably consists of a rubberlike material or a material similar to rubber.

In cross-section, the sealing ring 32 is formed as a circular disk. In cross-section, the bead 31 covers the sealing ring 32, an apex region 33 of the bead 31 that extends substantially concentrically in relation to the center point of the sealing ring cross-section merging on both sides, when viewed in the axial direction of the fitting 3, into flanks 3d, which run into the cylindrical wall of the fitting.

As represented in the exemplary embodiments, the press fitting 3 may be a fitting which at one end can receive a pipe 2 for pressing, while at the other end the fitting 3 is formed for example for welding to a further piece of pipe or the like. It goes without saying that the pressing tool 1 according to the invention and the proposed method can also be used on fittings 3 which are for example formed in the manner of a socket with a pressing portion at both ends, and additionally on press fittings 3 of a T shape, in the case of which it is possible, because of the pressing tool 1 according to the invention, for pressing to be performed with an inserted pipe at all three pipe receiving portions of the fitting, this being attributable in particular to the small space requirement of the tool on the side of the bead 31 opposite from the pipe insert side of the fitting 3.

In the exemplary embodiment represented, when viewed in the axial direction, the bead 31 continues on both sides into cylindrical portions of the fitting, thus on one side in the direction of an opening serving for receiving the pipe 2. The end face of the press fitting 3 delimiting the end of the press fitting 3 on the pipe-insert side is provided with the reference numeral 35.

The axial distance of the bead 31 from the end face 35 on the pipe-insert side is adapted to the axial extent a of the effective pressing geometry of the pressing tools 15 to 18. Accordingly, for pressing, the press fitting 3 lies in the pressing jaws in such a way that the bead 31 lies in the region of the bead pressing portion 22, while the flank 34 facing the gauge portion 29 is supported on the conical surface area 30 of the gauge portion 29. At the other end in the axial direction, axial support takes place between the end face 35 of the fitting and the engaging land 27, as a result of which axial fixing of the fitting 3 to be pressed in the pressing tool 1 is achieved.

For pressing, the pipe 2 is pushed into the fitting 3, in a stop-limited manner, which is achieved by a step 36 on the inner circumferential wall in the fitting 3. The inside diameter of the pipe fitting 3 and the outside diameter of the pipe 2 are adapted to one another, so that, already in the non-pressed state, the pipe lies securely in the fitting 3 in terms of tilting or canting. Lying in the annular space achieved between the bead 31 and the outer circumference of the pipe is the seal 32, which substantially retains its circular cross-section even after the pipe 2 has been pushed in.

The bead 31 has in the unpressed state a radial height n, which corresponds approximately to 2.5 to 3 times the wall thickness e of the fitting 3, the radial height n being determined by the radial dimension between the inner circumferential wall of the fitting 3 and the radially outer apex point of the bead 31.

In the case of an exemplary embodiment represented on the basis of a 4-inch pipe 2, the cross-sectional diameter of the ring 32 is approximately 5 mm, producing a width p of the bead 31 in the unpressed position, measured in the direction of axial extent, which corresponds approximately to three times the material thickness of the fitting, thus furthermore in the exemplary embodiment represented approximately 8 mm. According to the representation in FIG. 9, the measuring points for defining the width p, on which this dimension is based, lie approximately at the point of inflection from the apex 33, which is in the form of the segment of a circle, into the flanks 34 of the bead 31.

As can also be gathered from the representation in FIG. 9, when viewed in the axial direction, the bead 31 extends only over part of the length of axial extent of the bead pressing portion 22, thus furthermore over approximately two thirds of this axial length, with the flank 34 lying against the cone 30.

In the basic pressing position, that is with the pressing chain already closed, the pressing links 4, 5 and 12, 13 engage the press fitting 3 in the region of the cone pressing portions 25 on the outer circumferential side, while axial support at the end face is provided by means of the engaging land 27 on the associated end face 35 of the fitting 3.

In this basic position, the two gauge portions 28 and 29 engage the associated portions of the wall only in the diametrically opposite end regions of the portions in the form of a semicircular ring, approximately midway along the circumferential extent of the pressing links 12 and 13. This rather more point wise engagement is designated in the representations 4 and 5 by the reference numerals 37 and 38, with 37 designating the engagement zones of the gauge portion 28 on the pipe 2 and 38 designating the engagement zones of the gauge portion 29 on the fitting 3, to the rear of the flank 34 of the bead 31.

Starting from these supporting points 37 and 38, in the unpressed basic position the arcuate surface of the respective gauge portion 28 or 29 that is facing the workpiece rises toward the center of the gauge portion, so that the maximum radial distance between the gauge portion and the associated workpiece is reached opposite the force-introduction elements 14.

In this position, stabilizing of the pressing tool in relation to the longitudinal axis x of the pipe is carried out by means of the gauge portions 29 and 29.

In the course of the pressing, in which the pressing cross-section is reduced, a linear displacement of the gauge portions 28 and 29 takes place in a way corresponding to the displacement of the pressing link 5, so that in the course of the pressing operation said gauge portions offer circumferentially increased radial support to the workpieces to be pressed.

The drawing together of the pressing jaws achieves the effect both of a deformation of the fitting 3 and the pipe 2 in the region of the cone pressing portion 25 and a deformation in the region of the bead pressing portion 22. Here, the pressure acting upon the bead 31 radially from the outside brings about axial widening of the bead 31 by the cylindrical surface area 22' of the bead pressing portion 22, this resulting from a flattening of the apex 33, and of the flanks 34, resulting in a pressed bead width r, which corresponds approximately to 1.5 times the original bead width p and is furthermore adapted to the length of axial extent b of the bead pressing portion 22. This results furthermore in a bead height s that is reduced with respect to the original radial height n of the bead 31 by approximately the dimension of the material thickness e of the fitting 3. Accordingly, the annular space receiving the sealing ring 32 is also radially reduced, which results in a deformation of the 0-ring seal 32 into an elongated cross-section, when viewed in the axial direction, this being accompanied by an enlargement of the effective sealing areas. The rearward support on the gauge portion 29 has the effect that the axial widening of the bead 31 only takes place in one direction, namely in the direction of the end on the pipe-insert side.

Figure 12:
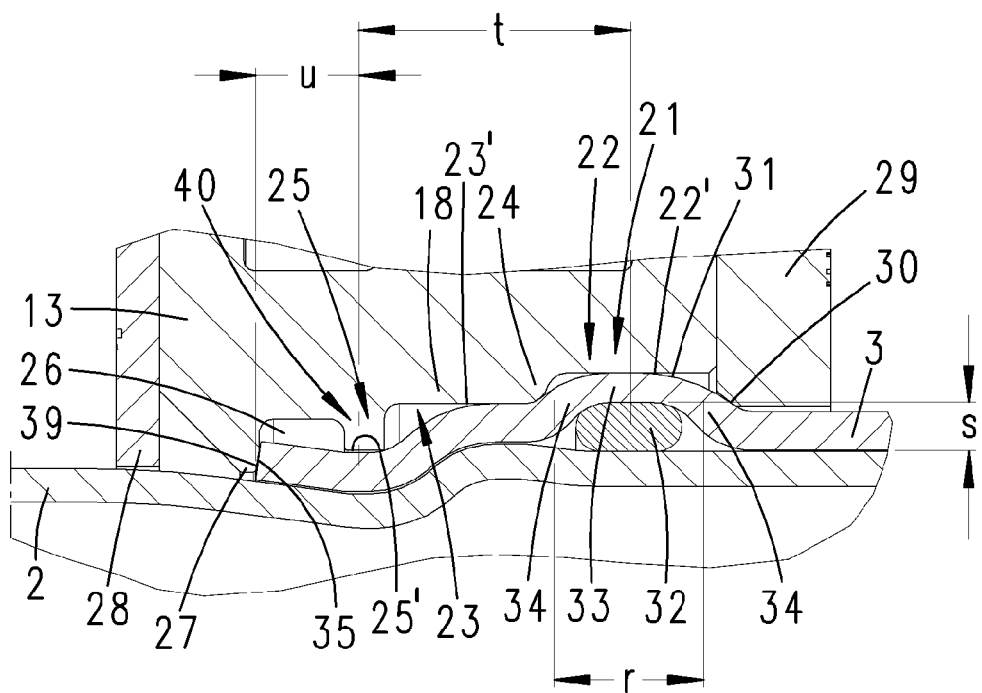
FIG. 12 shows the enlarged detail as per FIG. 9, for the pressing position.
Figure 13:
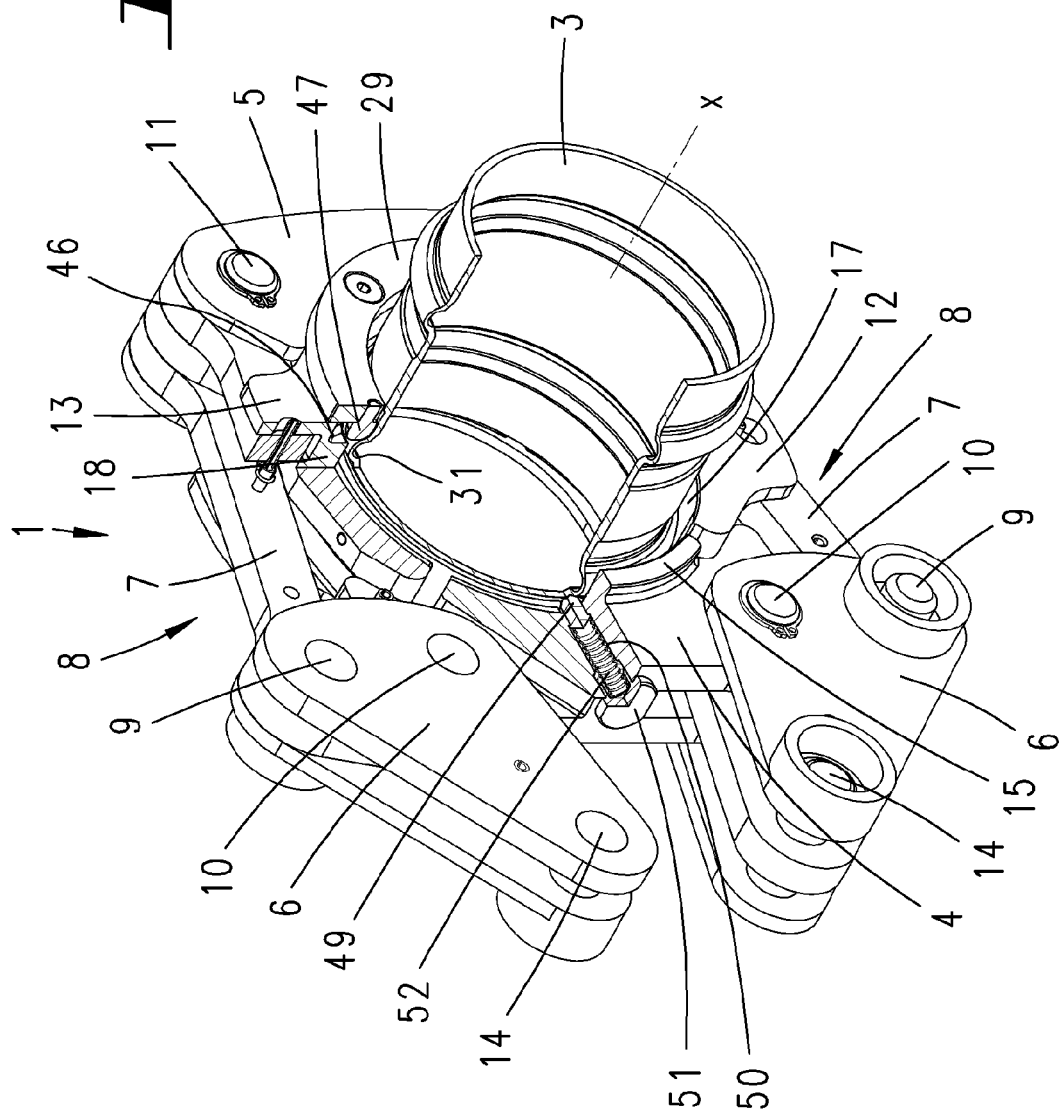
FIG. 13 shows the pressing tool in a second embodiment, in a perspective, partially sectional view, in the state in which it has been put in place and is ready for pressing, with the fitting inserted but without the pipe.

The cone pressing portion 25 provided at an axial distance t from the bead pressing portion 22 (measured from the respective axial central regions of the portions) brings about a re-shaping of the pipe 2 and the fitting 3 in such a way as to obtain a means for preventing one from being pulled off the other. This is achieved by a V-shaped profile of the wall portions being obtained in the section according to the representation in FIG. 12. Facing the bead pressing portion 22, the cone pressing portion 25 throws up both on the pipe side and on the fitting side a radially widening conical portion, which merges in the region of the calibrating pressing portion 23 into a cylindrical portion, albeit axially shortened in comparison with the calibrating pressing portion 23. The calibrating pressing portion 23 serves for shaping this cylindrical portion, not by applying pressure but rather by forming a sleeve which counteracts deformation deviating from the shape of a cylinder.

To prevent pulling off, on the other side of the thrown-up conical form described there is, facing the end face 35 on the pipe-insert side, a likewise conically rising-up form, widening toward the end on the pipe-insert side. The end portion of the fitting 3 rising up here partially enters the yielding space 26, without however losing the support on the engaging land 27, which, to make this radial throwing up possible, is provided with a corresponding sloping flank 39.

The axial distance between the axial central region of the pressed bead 31 and the inflection zone of the circumferential wall portions of the fitting 3 thrown up overall in the shape of a V corresponds to the previously described axial distance dimension t between the bead pressing portion 22 and the cone pressing portion 25. In the exemplary embodiment represented, the axial distance u from the end face 35, measured from this V apex of the circumferential thrown-up wall portions, corresponds approximately to 0.4 times the axial extent t, thus furthermore approximately to 3 times the material thickness e of the fitting 3.

The exemplary embodiment represented and described shows a pressing tool 1 in the form of a pressing chain. In particular for smaller pipe diameters and fitting diameters, however, it is also possible to use pressing tools which, acting in the manner of tongs, are provided with two half-shell-shaped pressing jaws that have the previously described pressing geometry.

FIGS. 13 to 20 show a second embodiment of the pressing tool 1 according to the invention, which has in the same way as the first embodiment four pressing links, which take part in an interacting manner in the operation of pressing the workpieces, thus furthermore in the manner of a pressing chain.

The basic structure of this pressing tool 1 of the second embodiment corresponds substantially to that of the exemplary embodiment previously described, for which reason the same components, groups of components and dimensions carry the same reference numerals.

The pressing tool 1 of the second embodiment is designed for the pressing of fittings 3 and pipes 2 of smaller diameter, thus for example with a diameter of 1.5 inches. However, the following design solutions can also be transferred to pressing tools 1 for the pressing of fittings 3 and pipes 2 of increased diameter, as described for example on the basis of the first exemplary embodiment.

The pressing jaws 15 to 18 of the pressing tool 1 according to the second embodiment are extended in length with respect to those of the first embodiment over the axial extent a of the overall pressing geometry. This is described by way of example in FIG. 17 with reference to the pressing jaw 18, the pressing geometries described in this respect being formed on all the pressing jaws as also in the first embodiment.

When viewed in the axial direction, the pressing jaw 18 of the second embodiment is laterally flanked by the gauge portions 28 and 29. As also in the first exemplary embodiment, the second pressing geometry 40 is directly adjacent the gauge portion 28, which second pressing geometry is followed in the axial direction by the first pressing geometry 21. A pressing jaw portion 45 is loft between the first pressing geometry 21 and the gauge portion 29 facing away from the free end of the fitting. This pressing jaw portion has an axial length j, which corresponds approximately to the axial length c of the calibrating pressing portion 23.

The widened pressing jaw portion 45 is partially radially enlarged with respect to the adjacent bead pressing portion 22, thus furthermore approximately by the radius oversize d between the pressing areas 23' and 22' of the calibrating pressing portion 23 and the bead pressing portion 22, which radius oversize d corresponds in this embodiment approximately to 1.5 times the material thickness e of the fitting 3 to be pressed. Furthermore, the radial oversize corresponds approximately to 0.5 times the height n of the bead 31 in the unpressed state, measured in the radial direction.

The pressing jaw portion 45 following the bead pressing portion 22 in the direction of the gauge portion 29 is not incorporated in the pressing geometry; it accordingly does not act in a shaping manner on the fitting 3 in the course of the pressing operation.

Figure 14:
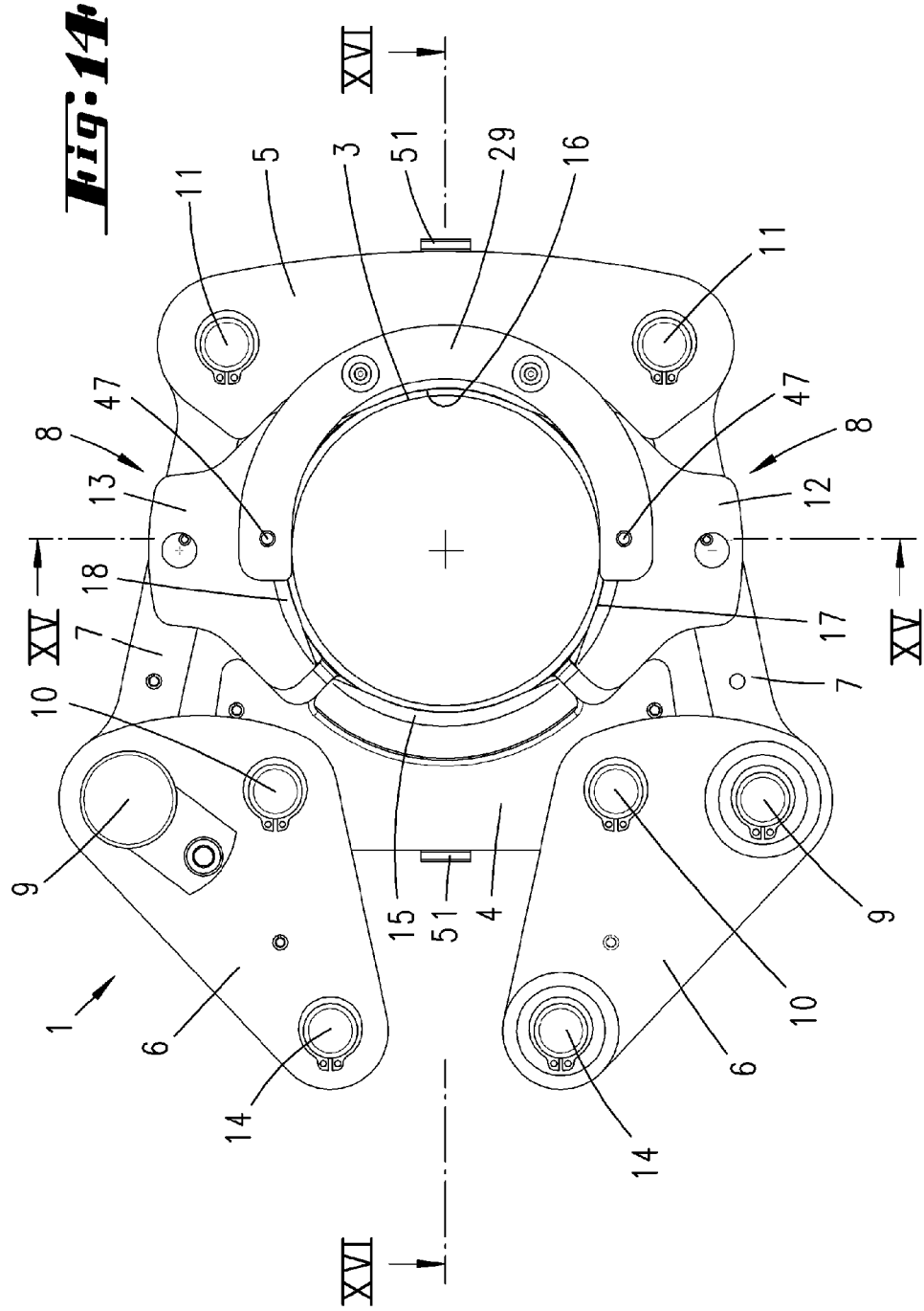
FIG. 14 shows a view corresponding to FIG. 4, for the second embodiment.
Figure 15:
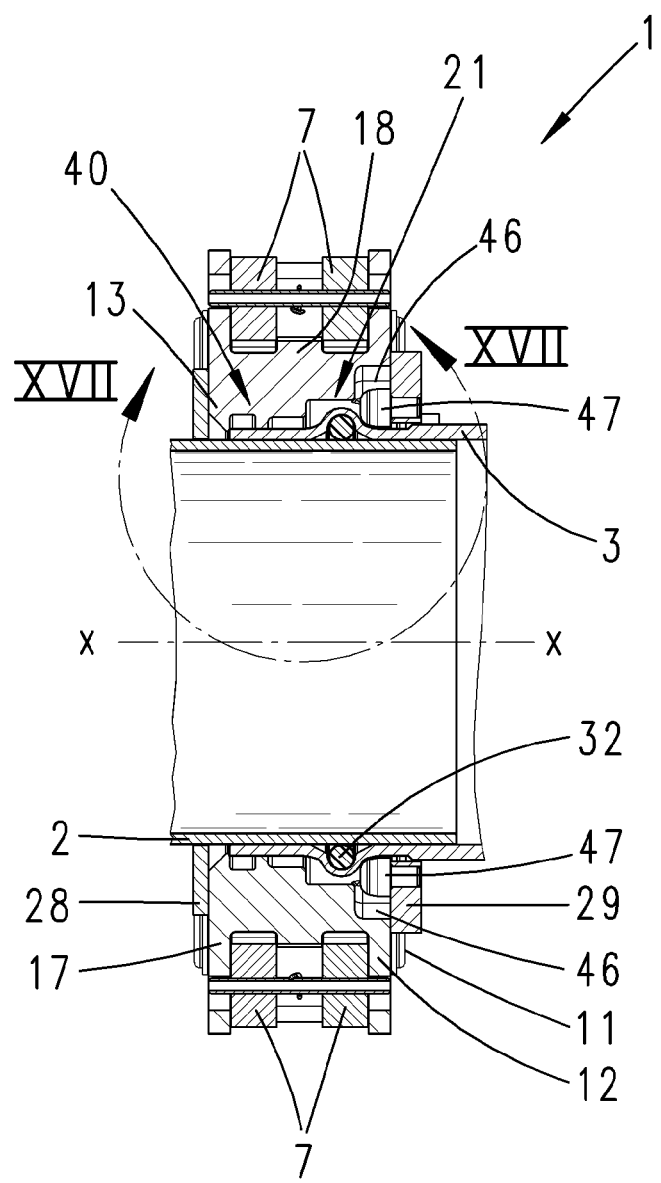
FIG. 15 shows the section along the line XV-XV in FIG. 14.
Figure 16:
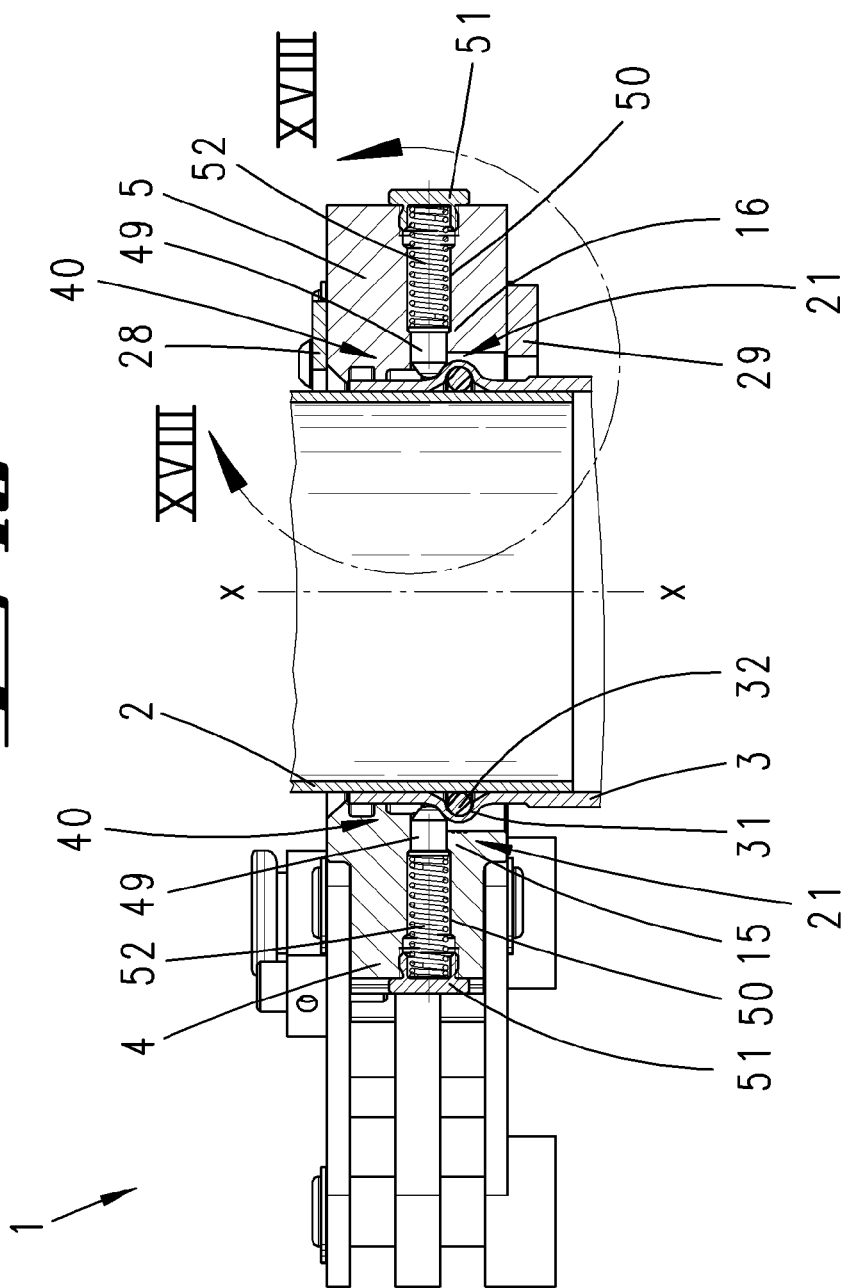
FIG. 16 shows the section along the line XVI-XVI in FIG. 14.
Figure 17:
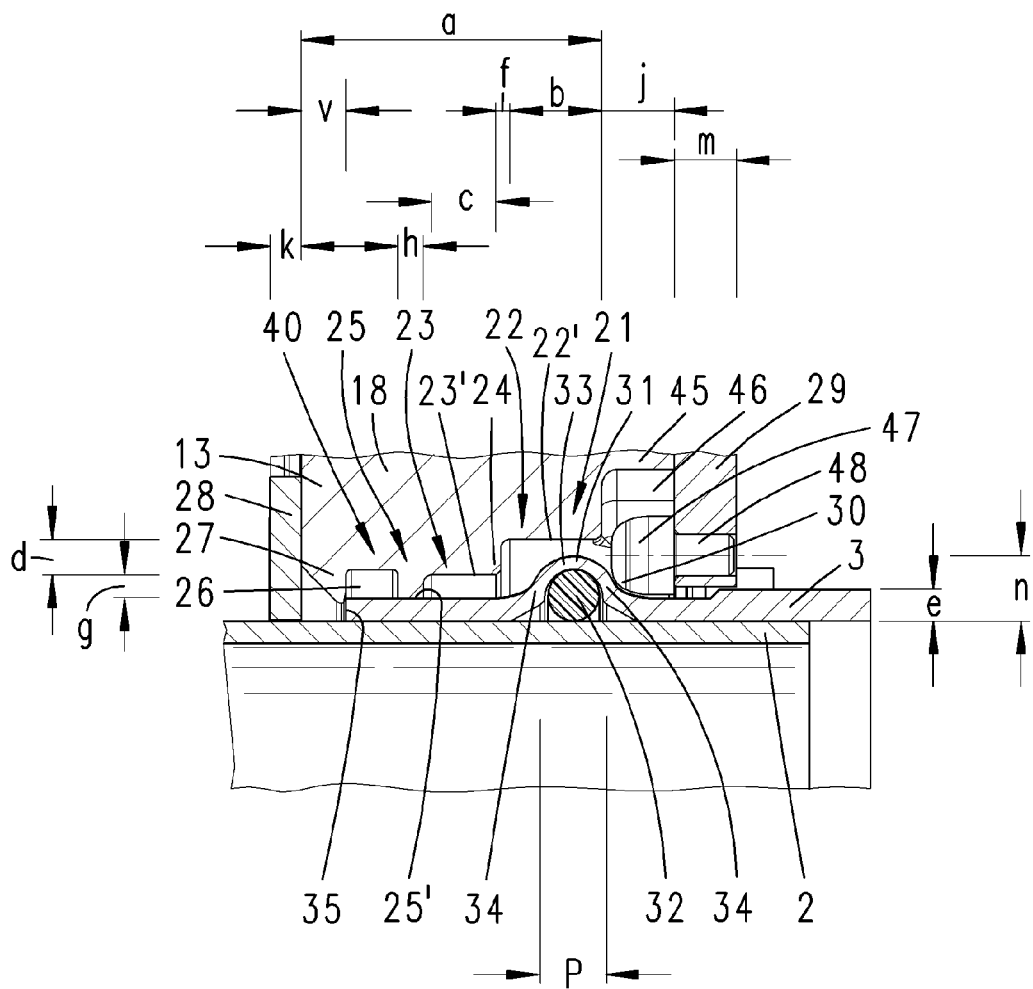
FIG. 17 shows the enlargement of the region XVII in FIG. 15.
Figure 18:
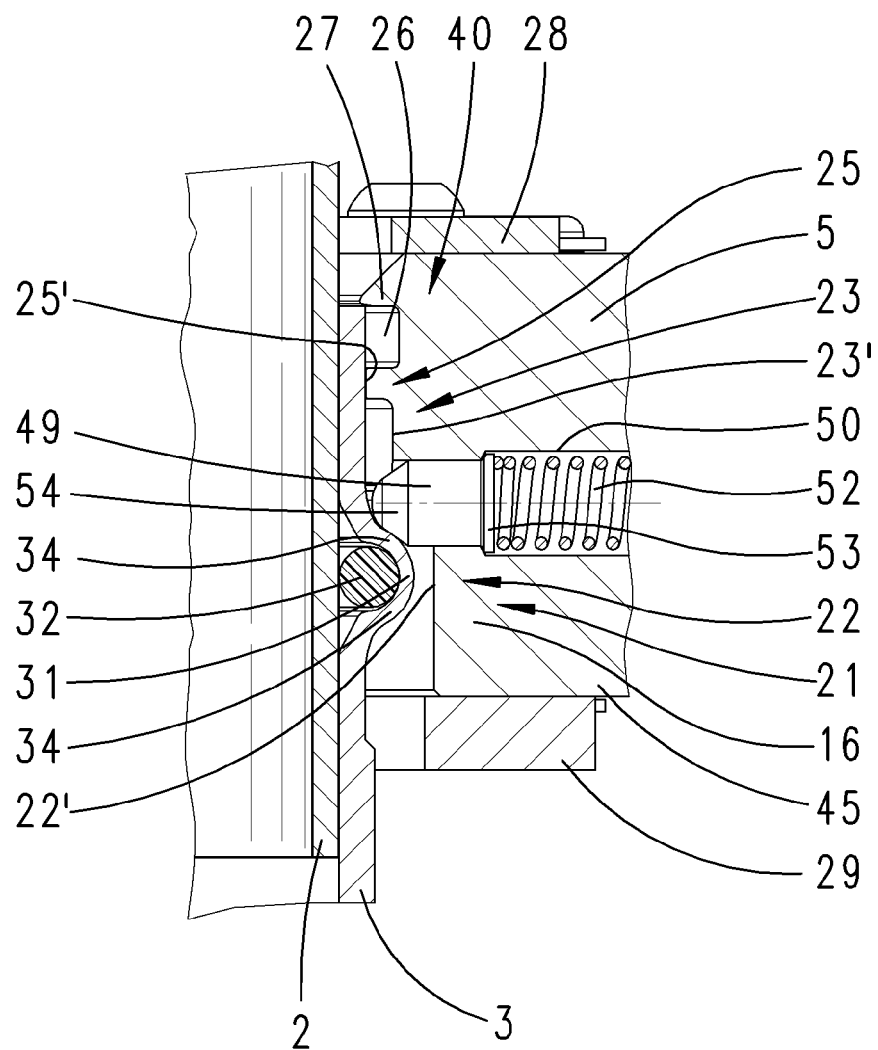
FIG. 18 shows the enlargement of the region XXVIII-XXVIII in FIG. 15.
Figure 19:
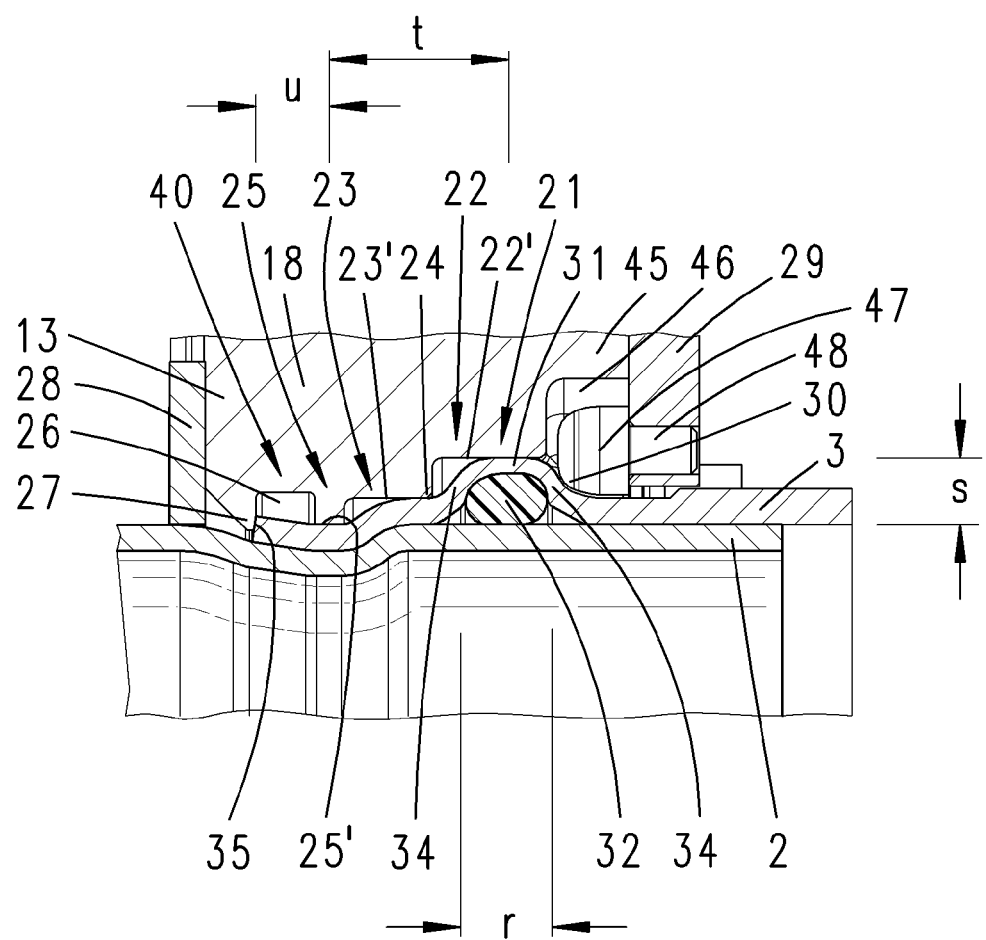
FIG. 19 shows the enlarged detail as per FIG. 17, but for the pressing position.

The radial widening in the region of the pressing jaw portion 45 is riot provided over the entire circumferential length of this portion 45, but rather only in two diametrically opposite regions with respect to the overall pressing tool 1, namely to be specific midway along the circumferential extents of the pressing links 12 and 13 or the pressing jaws 17 and 18, thus furthermore in the form of bore-like pockets 46, extending axially from the gauge portion 29. These pockets are covered toward their opening end by the flanking gauge portion 29, which, according to the representation in FIG. 14, is also formed in this embodiment approximately as a semicircular ring in plan view.

Facing the pressing jaw portion 45, the gauge portion 29 also carries engaging elements 47, associated with the pockets 46. These elements are provided with an axial depth which corresponds approximately to 0.8 times the length j of the pressing jaw portion 45, measured in the same direction. The two diametrically opposite engaging elements 47 are formed substantially in a pin-like fashion, with a base 48 secured in the gauge portion 29. This base 48 carries a cap portion, which has an increased diameter with respect to said base and, facing the free end, has an encircling conical surface area 30 adapted to the bead flanks 34. The arrangement and configuration of the engaging elements 47 is chosen such that, in a position prepared for pressing, according to the representation in FIG. 17, the conical surface area 30 of the respective engaging element 47 is supported against the bead flank 34 facing away from the free end of the fitting, and so undertakes the function of the conical surface area 30 of the gauge portion 29 according to the first embodiment.

When viewed over the circumference of the pressing jaw 18 or the opposite pressing jaw 17, outside the pockets 46, the respective pressing jaw portion 45 is selected in respect of its radial dimension such that its radially inner surface area coincides with the pressing area 22' of the bead pressing portion 22. This applies to the pressing jaws 15 and 16 over their respective overall circumferential portion (cf. FIG. 18).

When viewed in the circumferential direction, the pressing links 4 and 5 each have centrally, in the region of their pressing jaws 15 and 16, a radially prestressed pressing portion 49 in the form of a pin-like, radially inwardly spring-loaded element.

When viewed in the axial direction, this pressing portion 49 is positioned in the region of the transitional portion 24 between the calibrating pressing portion 23 and the bead pressing portion 22. Provided for this purpose is a radial bore 50, which is covered radially outwardly by caps 51, for example screw caps. Radially inwardly, the bore 50 tapers and runs out openly into the pressing space.

In the bore 50, to be specific in the region of increased diameter, there lies in each case a compression spring 52, which acts radially inward upon the pressing portion 49. For this purpose, the pressing portion 49 has a disk portion 53 of increased diameter with respect to the portion that protrudes freely radially inwardly. Adapted in diameter, this disk portion lies the bore 50. The compression spring 52 acts on this disk 52, which at the same time acts in a stop limiting manner.

Each pressing portion 49 is formed as a circular cylinder with a conically formed tip 54, the cone angle being adapted to the angle of a facing bead flank 34. In the exemplary embodiment represented, the diameter of each pressing portion 49 corresponds approximately to 1.2 times the axial length c of the calibrating pressing portion 23.

In preparation for a pressing operation, the fitting 3 is inserted together with the pipe 2 into the pressing tool 1 in a way corresponding to the first embodiment, after which a centering of the pressing tool 1 in relation to the fitting 3, in particular the bead 31, is achieved by way of the two engaging elements 47 on the gage side and the two prestressed pressing portions 49 disposed offset in relation to said elements by 90° in the circumferential direction. As a result of the engagement against the associated bead flank 34, the bead 31 or the opposite bead flank 34 is pressed against the conical surface areas 30 of the engaging elements 47 by the radially inwardly spring-loaded pressing portions 49, which results in self centering.

Also in the case of this embodiment, the drawing together of the pressing jaws achieves the effect in the course of the pressing both of a deformation of the fitting 3 and the pipe 2 in the region of the cone pressing portion 25 and a deformation in the region of the bead pressing portion 22. Here, the pressure acting upon the bead 31 radially from the outside brings about axial widening of the bead 31 by the cylindrical area 22' of the bead pressing portion 22, this resulting from a flattening of the apex 33, and of the flanks 34, resulting here in a pressed bead width r (cf. FIG. 19), which corresponds approximately to 1.3 times the original bead width p. The annular space receiving the sealing ring 32 is radially reduced, which results in a deformation of the 0-ring seal 32 into an elongated cross-section, when viewed in the axial direction, this being accompanied by an enlargement of the effective sealing area.

The re-shaping of the pipe 2 and the fitting 3 in the region of the cone pressing portion 25 is also fashioned in a way corresponding to the deformation according to the first exemplary embodiment.

The engaging elements 47 secured in the gauge portion 29 and facing in the direction of the bead 31 at least partially bring about a deformation of the bead 31 in the course of the pressing operation only in the direction of the free insert end of the fitting 3 as per the corresponding supporting of the bead 31 on the conical surface area 30 of the gauge portion 29 in the first exemplary embodiment.

In the course of the pressing operation, the spring-loaded pressing portions 49 are retracted radially outward into the bore 50, while overcoming the spring force acting on them from the rear. This radial displacement of the pressing portions 49 takes place before pressing of the region interacting directly with these pressing portions 49, in order to avoid damage to the fitting 3 and/or the pipe 2. The spring force of the respective compression spring 52 is chosen here such that the tip 54 of each pressing portion 49 is always in contact with the facing flank 34 of the bead 31, although furthermore, due to the axial widening of the bead 31, in the course of the pressing there is also the effect by way of the bead flank 34 that a radial component also acts radially outward on the associated pressing portion 49. The pressing portions 49 provide the desired centering of the pressing tool 1 and the pipe/fitting arrangement even during the pressing operation.

On the one hand because of the selected, relatively large cylindrical diameter of the pressing portions 49, but also because of the full-area support on the bore hole wall, achieved approximately over half the circumference of the pressing portion 49, at least when viewed in the direction of the insert end of the fitting 3, throughout the entire pressing operation, adequate support of the pressing portions 49 is created. The forces acting on the pressing portion 49 by way of the axially widening bead 31, not only radially but also axially with respect to the fitting axis, in the course of the pressing operation can thus always be dissipated over a large surface area into the solid pressing jaw 17 or 18. Accordingly, no shear forces, or only negligible shear forces, act on the pressing portions 49.

All features disclosed are (in themselves) pertinent to the invention. The disclosure content of the associated/accompanying priority documents (copy of the prior patent application) is also hereby incorporated in full in the disclosure of the application, including for the purpose of incorporating features of these documents in claims of the present application.

While preferred embodiments of the present invention are shown and described, it is envisioned that those skilled in the art may devise various modifications of the present invention without departing from the spirit and scope of the appended claims.

What is claimed is:

1. A combination comprising:
    a press fitting, said press fitting having a bead encircling said press fitting and a pipe-insert side, said pipe-insert side defining an end face of the press fitting; and
    a pressing tool for the pressing of said press fitting onto a pipe, said pressing tool comprising
    first, second, third and fourth pressing links, said first and second pressing links being positioned opposite to each other, said third and fourth pressing links being positioned opposite to each other,
    a first toggle lever connected to said first, second and third pressing links, and a second toggle lever connected to said first, second and fourth pressing links, said first pressing link being slidably engaged with said third and fourth pressing links,
    said second pressing link being slidably engaged with said third and fourth pressing links,
    each said pressing link having a pressing jaw formed thereon comprised of a first pressing geometry forming a bead pressing portion and a second pressing geometry spaced apart axially from said first pressing geometry forming a cone pressing portion,
    said bead pressing portion pressing said bead of said press fitting during pressing causing an axial widening of said bead, said cone pressing portion of said second pressing geometry preventing a pressed combination of the press fitting and the pipe from being pulled off one another, the second pressing geometry being formed on the pipe-insert side of the bead with respect to the combination of the press fitting and the pipe.

2. The combination of claim 1, further comprising an engaging member engaging the end face of the press fitting for axially aligning the pressing tool with the press fitting.

3. The combination of claim 2, said second pressing geometry of said at least one pressing jaws provided between said engaging member and said respective first pressing geometry.

4. The combination of claim 2, wherein said engagement member is an engaging land formed on at least one of said pressing jaws.

5. The combination of claim 2, wherein said engagement member is an engaging land integrally formed on at least one of said pressing jaws.

6. The combination of claim 1, further including a radially prestressed pressing portion having a predefined prestressing force, said radially prestressed pressing portion provided in the first pressing geometry, said bead pressing portion yields radially during pressing when the prestressing force is reached.

7. The combination of claim 1, wherein said first pressing geometry has a cylindrical portion.

8. The combination of claim 1, wherein said bead has opposite sides, and a gauge portion is formed on the pressing tool at the side of the bead that faces away from the end of the press fitting.

9. The combination of claim 8, wherein the gauge portion prevents axial widening of the bead on the side of the bead that is facing away from the end of the press fitting.

10. The combination of claim 9, wherein the preventing effect is achieved by engaging elements formed on the gauge portion and facing toward the bead.

11. The combination of claim 10, wherein the bead has a contour, and said engaging element is adapted to the contour of the bead.

12. The combination of claim 1, wherein a calibrating pressing portion is formed between the bead pressing portion and the cone pressing portion.

13. The combination of claim 12, wherein the calibrating pressing portion has a cylindrical portion.

14. The combination of claim 13, wherein a transitional portion corresponding to at least an axial width of the cone pressing portion is formed between the bead pressing portion and the calibrating pressing portion.

\* \* \* \* \*